(12) United States Patent
Björkman et al.

(10) Patent No.: US 12,356,112 B2
(45) Date of Patent: Jul. 8, 2025

(54) SYSTEM AND METHOD FOR PRODUCING A VIDEO STREAM

(71) Applicant: LIVEARENA TECHNOLOGIES AB, Stockholm (SE)

(72) Inventors: Andreas Björkman, Täby (SE); Anders Nilsson, Falköping (SE); Lars Erlman, Leksand (SE)

(73) Assignee: LiveArena Technologies AB, Stockholm (SE)

( * ) Notice: Subject to any disclaimer, the term of this patent is extended or adjusted under 35 U.S.C. 154(b) by 0 days.

(21) Appl. No.: 18/668,306

(22) Filed: May 20, 2024

(65) Prior Publication Data
US 2024/0305837 A1 Sep. 12, 2024

Related U.S. Application Data

(63) Continuation of application No. PCT/SE2022/051033, filed on Nov. 7, 2022.

(30) Foreign Application Priority Data

Nov. 30, 2021 (SE) .................................. 2151461-7

(51) Int. Cl.
| | |
|---|---|
| *H04N 21/234* | (2011.01) |
| *G06V 20/40* | (2022.01) |
| *H04N 5/04* | (2006.01) |
| *H04N 7/08* | (2006.01) |
| *H04N 7/15* | (2006.01) |
| *H04N 21/2187* | (2011.01) |

(Continued)

(52) U.S. Cl.
CPC ........... *H04N 7/0806* (2013.01); *G06V 20/44* (2022.01); *H04N 5/04* (2013.01); *H04N 7/15* (2013.01);

(Continued)

(58) Field of Classification Search
CPC ............ H04N 7/155; H04N 21/21805; H04N 21/4788; H04N 21/2187; H04N 7/147;
(Continued)

(56) References Cited

U.S. PATENT DOCUMENTS

| | | | |
|---|---|---|---|
| 5,638,114 A | 6/1997 | Hatanaka et al. | |
| 11,082,467 B1 * | 8/2021 | Hartnett | ................ H04L 65/403 |

(Continued)

FOREIGN PATENT DOCUMENTS

| | | |
|---|---|---|
| EP | 2629512 A1 | 8/2013 |
| EP | 3908006 A2 | 11/2021 |

OTHER PUBLICATIONS

International search report issued on Dec. 21, 2022 by the Swedish Intellectual Property Office.
(Continued)

*Primary Examiner* — Alazar Tilahun
(74) *Attorney, Agent, or Firm* — Noréns Patentbyrå AB

(57) ABSTRACT

Method, system and computer program product for providing a second digital video stream. In a collecting step, a first and a second primary digital video stream are collected from at least two different digital video sources. In a first production step, a first produced video stream is produced based on the first and second primary streams. In a second production step, the second stream is produced based on the first produced stream and also based on the first and second primary streams. In the second production step, the first and second primary streams are time-delayed so as to time-synchronise them with the first produced stream, taking into consideration a latency of the first produced stream resulting from the first production step, the second produced stream being produced based on the time-delayed first and second primary streams.

12 Claims, 7 Drawing Sheets

Figure 1:
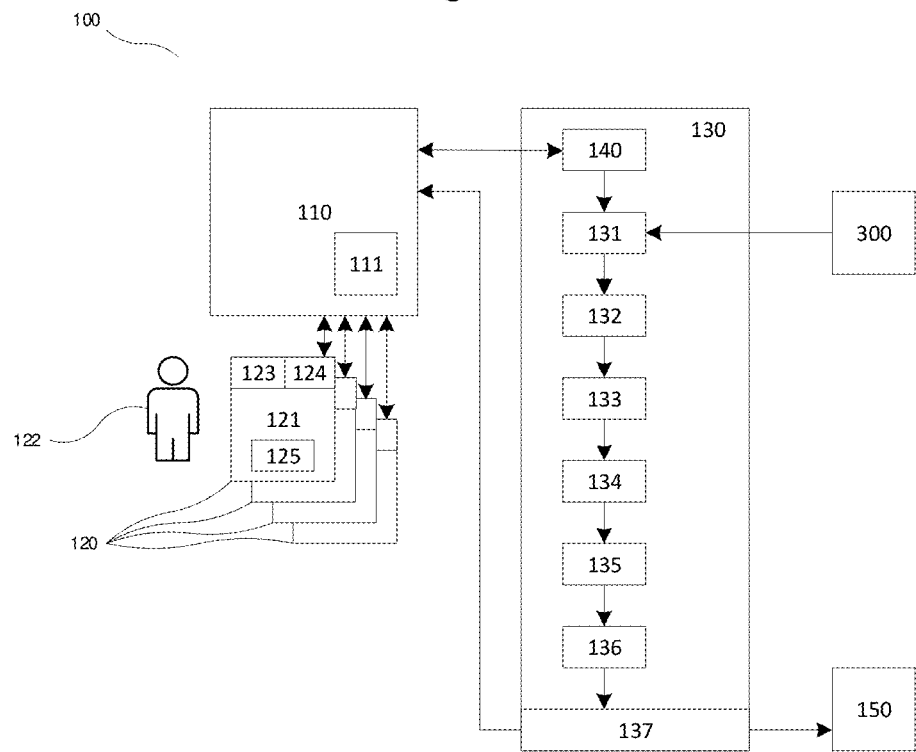

(51) Int. Cl.
  *H04N 21/2365* (2011.01)
  *H04N 21/242* (2011.01)
(52) U.S. Cl.
  CPC ......... *H04N 7/152* (2013.01); *H04N 21/2187* (2013.01); *H04N 21/234* (2013.01); *H04N 21/23418* (2013.01); *H04N 21/2365* (2013.01); *H04N 21/242* (2013.01)
(58) Field of Classification Search
  CPC ....... H04N 21/4307; H04N 21/440272; H04N 21/41265; H04N 21/234
  See application file for complete search history.

(56) References Cited

U.S. PATENT DOCUMENTS

| | | |
|---|---|---|
| 2013/0216206 A1 | 8/2013 | Dubin et al. |
| 2015/0312521 A1* | 10/2015 | Bright-Thomas ...... H04N 7/152 348/14.09 |
| 2018/0367757 A1 | 12/2018 | Faulkner et al. |
| 2018/0375676 A1 | 12/2018 | Bader-Natal et al. |
| 2020/0267427 A1* | 8/2020 | Rogers ................... H04N 21/84 |
| 2021/0235137 A1* | 7/2021 | Shen ................... H04N 21/2387 |
| 2021/0314238 A1 | 10/2021 | Cioffi et al. |

OTHER PUBLICATIONS

International preliminary examination report issued by the IPEA on Jan. 15, 2024.
European search report issued on Feb. 7, 2025 by the European Patent Office.

\* cited by examiner

SYSTEM AND METHOD FOR PRODUCING A VIDEO STREAM

The present invention relates to a system, computer software product and method for producing a digital video stream, and in particular for producing a digital video stream based on two or more different digital input video streams. In preferred embodiments, the digital video stream is produced in the context of a digital video conference or a digital video conference or meeting system, particularly involving a plurality of different concurrent users. The produced digital video stream may be published externally or within a digital video conference or digital video conference system.

In other embodiments, the present invention is applied in contexts that are not digital video conferences, but where several digital video input streams are handled concurrently and combined into a produced digital video stream. For instance, such contexts may be educational or instructional.

There are many known digital video conference systems, such as Microsoft® Teams®, Zoom® and Google Meet®, offering two or more participants to meet virtually using digital video and audio recorded locally and broadcast to all participants to emulate a physical meeting.

There is a general need to improve such digital video conference solutions, in particular with respect to the production of viewed content, such as what is shown to whom at what time, and via what distribution channels.

For instance, some systems automatically detect a currently talking participant, and show the corresponding video feed of the talking participant to the other participants. In many systems it is possible to share graphics, such as the currently displayed screen, a viewing window or a digital presentation. As virtual meetings become more complex, however, it quickly becomes more difficult for the service to know what of all currently available information to show to each participant at each point in time.

In other examples a presenting participant moves around on a stage while talking about slides in a digital presentation. The system then needs to decide whether to show the presentation, the presenter or both, or to switch between the two.

It may be desirable to produce one or several output digital video streams based on a number of input digital video streams by an automatic production process, and to provide such produced digital video stream or streams to one or several consumers.

However, in many cases it is difficult for a dynamic conference screen layout manager or other automated production function to select what information to show, due to a number of technical difficulties facing such digital video conference systems.

Firstly, since a digital video meeting has a real-time aspect, it is important that latency is low. This poses problems when different incoming digital video streams, such as from different participants joining using different hardware, are associated with different latencies, frame rates, aspect ratios or resolutions. Many times, such incoming digital video streams need processing for a well-formed user experience.

Secondly, there is a problem with time synchronisation. Since the various input digital video streams, such as external digital video streams or digital video streams provided by participants, are typically fed to a central server or similar, there is no absolute time to synchronise each such digital video feed to. Like too high latency, unsynchronised digital video feeds will lead to poor user experiences.

Thirdly, multi-party digital video meetings can involve different digital video streams having different encodings or formats, that require decoding and re-encoding in turn producing problems in terms of latency and synchronisation. Such encoding is also computationally burdensome and therefore costly in terms of hardware requirements.

Fourthly, the fact that different digital video sources may be associated with different frame rates, aspect ratios and resolutions may also result in that memory allocation needs may vary unpredictably requiring continuous balancing. This potentially results in additional latency and synchronisation problems. The result is large buffer requirements.

Fifthly, participants may experience various challenges in terms of variable connectivity, leaving/reconnecting etc., posing further challenges in automatically producing a well-formed user experience.

These problems are amplified in more complex meeting situations, for instance involving many participants; participants using different hardware and/or software to connect; externally provided digital video streams; screen-sharing; or multiple hosts.

The corresponding problems arise in said other contexts where an output digital video stream is to be produced based on several input digital video streams, such as in digital video production systems for education and instruction.

Swedish application SE 2151267-8, which has not been published at the effective date of the present application, discloses various solutions to the above-discussed problems.

There are further problems relating to latency in multi-participant digital video environments. In particular, latency requirements may vary across different participants. In such environments it has turned out to be difficult to present all participant with a well time-synchronised experience, in which time-delays do no adversely affect communication. This is particularly the case in video environments with complex configurations, for instance using intermediately produced multi-participant video stream and/or involving several types of participants.

The present invention solves one or several of the above described problems.

Hence, the invention relates to a method for providing a second digital video stream, the method comprising in a collecting step, collecting from a first participant client a first primary digital video stream, from a second participant client a second primary digital video stream and from a third participant client a third primary digital video stream; in a publishing step, providing to at least one of said first participant client and said second participating client at least one of said first primary digital video stream, said second primary digital video and a first produced video stream having been produced based on at least one of said first and second primary video streams; in a second production step, producing the second produced video stream as a digital video stream based on said first primary digital video stream, said second primary digital video stream and said third primary digital video stream, said second production step introducing a time-delay so that the second produced video stream is time-unsynchronised with any video streams provided to said first or second participant clients in the publishing step, said publishing step further comprising continuously providing said second produced video stream to at least one consuming client not being the first or second participating client.

The invention also relates to a method for providing a second digital video stream, the method comprising in a collecting step, collecting from at least two different digital video sources a first primary digital video stream and a second primary digital video stream; in a first production step, producing a first produced video stream as a digital video stream based on said first and second primary digital video streams; in a second production step, producing the second produced video stream as a digital video stream based on said first produced video stream and also based on said first and second primary digital video streams; and in said second production step, time-delaying said first and second primary digital video streams so as to time-synchronise them with the first produced video stream, taking into consideration a latency of the first produced video stream resulting from the first production step, the second produced video stream being produced based on the time-delayed first and second primary digital video streams.

The present invention also relates to a method for providing a second digital video stream, the method comprising in a collecting step, collecting from a first participant client a first primary digital video stream, from a second participant client a second primary digital video stream and from a third participant client a third primary digital video stream; in a first production step, producing a first produced video stream as a digital video stream based on said first and second primary digital video streams, the first produced digital video stream being continuously produced for publication with a first latency; in a second production step, producing the second produced video stream as a digital video stream based on said first, second and third primary digital video streams, the second produced digital video stream being continuously produced for publication with a second latency, the second latency being larger than the first latency; and in a publishing step, continuously providing at least one of said first primary digital video stream, said second primary digital video stream and said first produced video stream to at least one of the first participating client and the second participating client and continuously providing said second produced video stream to at least one other participating client.

The invention also relates to a computer software product for providing a second digital video stream, the computer software function being arranged to, when executing, perform a collecting step, wherein a first primary digital video stream is collected from a first participant client, a second primary digital video stream is collected from a second participant client and a third primary digital video stream is collected from a third participant client; publishing step, wherein at least one of said first primary digital video stream, said second primary digital video and a first produced video stream having been produced based on at least one of said first and second primary video streams is provided to at least one of said first participant client and said second participating client; a second production step, wherein the second produced video stream is produced as a digital video stream based on said first primary digital video stream, said second primary digital video stream and said third primary digital video stream, said second production step introducing a time-delay so that the second produced video stream is time-unsynchronised with any video streams provided to said first or second participant clients in the publishing step, wherein said publishing step further comprising continuously providing said second produced video stream to at least one consuming client not being the first or second participating client.

The invention also relates to a computer software product for providing a shared digital video stream, the computer software function being arranged to, when executing, perform a collecting step, wherein a first primary digital video stream and a second primary digital video stream are collected from at least two different digital video sources; a first production step, wherein a first produced video stream is produced as a digital video stream based on said first and second primary digital video streams; a second production step, wherein the second produced video stream is produced as a digital video stream based on said first produced video stream and also based on said first and second primary digital video streams; and wherein, in said second production step, said first and second primary digital video streams are time-delayed so as to time-synchronise them with the first produced video stream, taking into consideration a latency of the first produced video stream resulting from the first production step, the second produced video stream being produced based on the time-delayed first and second primary digital video streams.

The invention also relates to a computer software product for providing a shared digital video stream, the computer software function being arranged to, when executing, perform a collecting step, wherein a first primary digital video stream is collected from a first participant client, a second primary digital video stream is collected from a second participant client and a third primary digital video stream is collected from a third participant client; a first production step, wherein a first produced video stream is produced as a digital video stream based on said first and second primary digital video streams, the first produced digital video stream being continuously produced for publication with a first latency; a second production step, wherein the second produced video stream is produced as a digital video stream based on said first, second and third primary digital video streams, the second produced digital video stream being continuously produced for publication with a second latency, the second latency being larger than the first latency; and a publishing step, wherein at least one of said first primary digital video stream, said second primary digital video stream and said first produced video stream is continuously provided to at least one of the first participating client and the second participating client and said second produced video stream is continuously provided to at least one other participating client.

The invention also relates to a system for providing a second digital video stream, the system comprising a central server in turn comprising a collecting function, wherein a first primary digital video stream is collected from a first participant client, a second primary digital video stream is collected from a second participant client and a third primary digital video stream is collected from a third participant client; a publishing function, wherein at least one of said first primary digital video stream, said second primary digital video and a first produced video stream having been produced based on at least one of said first and second primary video streams is provided to at least one of said first participant client and said second participating client; a second production function, wherein the second produced video stream is produced as a digital video stream based on said first primary digital video stream, said second primary digital video stream and said third primary digital video stream, said second production step introducing a time-delay so that the second produced video stream is time-unsynchronised with any video streams provided to said first or second participant clients in the publishing step, wherein said publishing function comprises continuously providing said second produced video stream to at least one consuming client not being the first or second participating client.

Moreover, the invention relates to a system for providing a shared digital video stream, the system comprising a central server in turn comprising a collecting function, wherein a first primary digital video stream and a second primary digital video stream are collected from at least two different digital video sources; a first production function, wherein a first produced video stream is produced as a digital video stream based on said first and second primary digital video streams; a second production function, wherein the second produced video stream is produced as a digital video stream based on said first produced video stream and also based on said first and second primary digital video streams; and wherein, in said second production function, said first and second primary digital video streams are time-delayed so as to time-synchronise them with the first produced video stream, taking into consideration a latency of the first produced video stream resulting from the first production function, the second produced video stream being produced based on the time-delayed first and second primary digital video streams.

The invention also relates to a system for providing a shared digital video stream, the system comprising a central server in turn comprising a collecting function, wherein a first primary digital video stream is collected from a first participant client, a second primary digital video stream is collected from a second participant client and a third primary digital video stream is collected from a third participant client; a first production function, wherein a first produced video stream is produced as a digital video stream based on said first and second primary digital video streams, the first produced digital video stream being continuously produced for publication with a first latency; a second production function, wherein the second produced video stream is produced as a digital video stream based on said first, second and third primary digital video streams, the second produced digital video stream being continuously produced for publication with a second latency, the second latency being larger than the first latency; and a publishing function, wherein at least one of said first primary digital video stream, said second primary digital video stream and said first produced video stream is continuously provided to at least one of the first participating client and the second participating client and said second produced video stream is continuously provided to at least one other participating client.

Moreover, the invention relates to a system.

Figure 2:
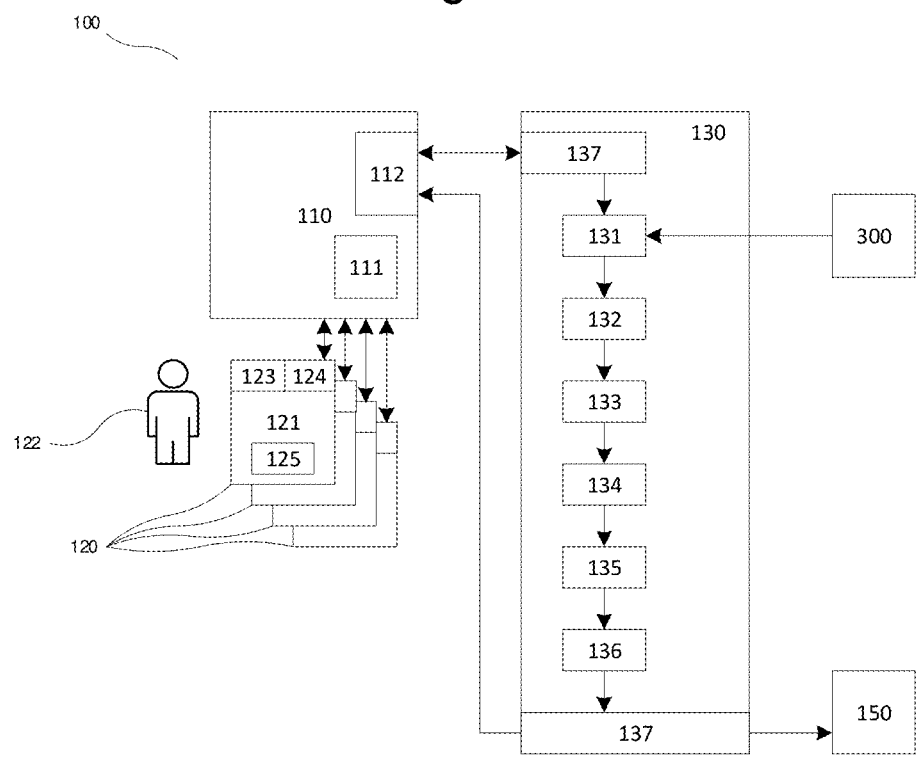
Figure 3:
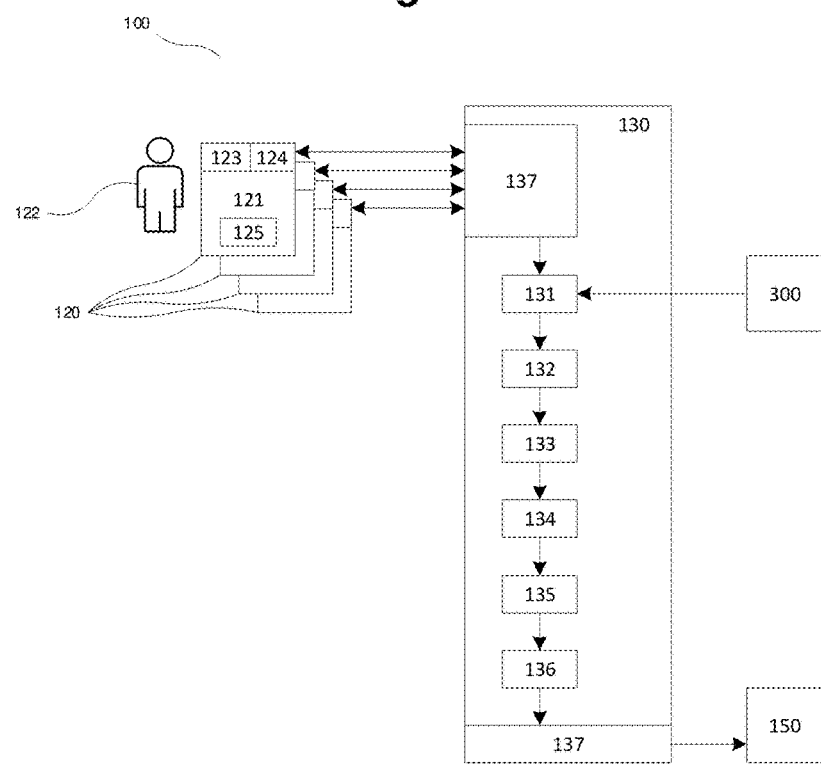
Figure 4:
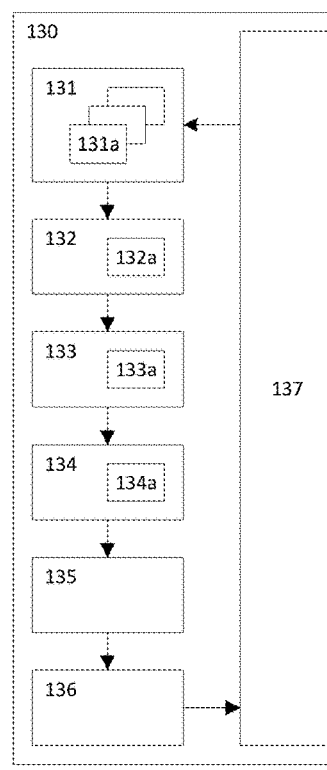
Figure 5:
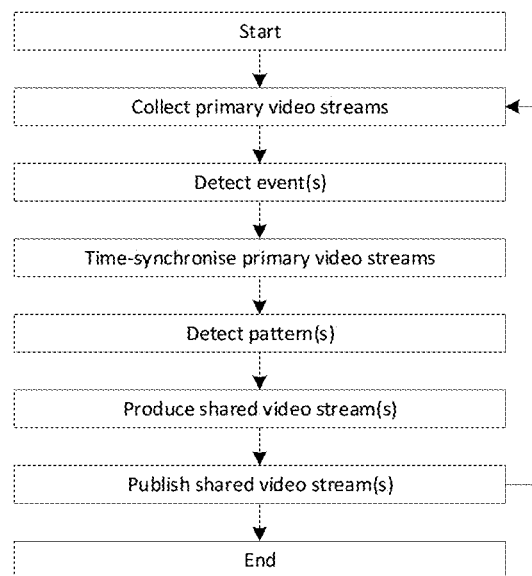
Figure 7:
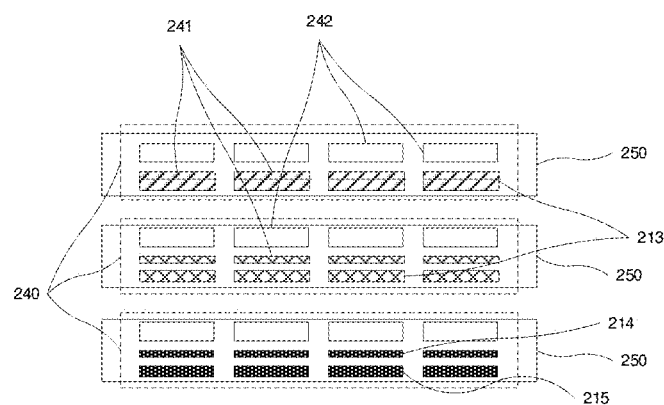

In the following, the invention will be described in detail, with reference to exemplifying embodiments of the invention and to the enclosed drawings, wherein:

FIG. 1 illustrates a first exemplifying system;
FIG. 2 illustrates a second exemplifying system;
FIG. 3 illustrates a third exemplifying system;
FIG. 4 illustrates a central server;
FIG. 5 illustrates a first method;
FIGS. 6a-6f illustrate subsequent states in relation to the different method steps in the method illustrated in FIG. 5;
FIG. 7 illustrates, conceptually, a common protocol;
FIGS. 8a-8d illustrate a second, third, fourth and fifth method; and
FIG. 9 illustrates a fourth exemplifying system.

All Figures share reference numerals for the same or corresponding parts.

FIG. 1 illustrates a system 100 according to the present invention, arranged to perform a method according to the invention for providing a digital video stream, such as a shared digital video stream.

The system 100 may comprise a video communication service 110, but the video communication service 110 may also be external to the system 100 in some embodiments. As will be discussed, there may be more than one video communication service 110.

The system 100 may comprise one or several participant clients 121, but one, some or all participant clients 121 may also be external to the system 100 in some embodiments.

The system 100 may comprise a central server 130.

As used herein, the term "central server" is a computer-implemented functionality that is arranged to be accessed in a logically centralised manner, such as via a well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers.

The physical or virtual hardware that the central server 130 runs on, in other words that computer software defining the functionality of the central server 130, may comprise a per se conventional CPU, a per se conventional GPU, a per se conventional RAM/ROM memory, a per se conventional computer bus, and a per se conventional external communication functionality such as an internet connection.

Each video communication service 110, to the extent it is used, is also a central server in said sense, that may be a different central server than the central server 130 or a part of the central server 130.

Correspondingly, each of said participant clients 121 may be a central server in said sense, with the corresponding interpretation, and physical or virtual hardware that each participant client 121 runs on, in other words that computer software defining the functionality of the participant client 121, may also comprise a per se conventional CPU/GPU, a per se conventional RAM/ROM memory, a per se conventional computer bus, and a per se conventional external communication functionality such as an internet connection.

Each participant client 121 also typically comprises or is in communication with a computer screen, arranged to display video content provided to the participant client 121 as a part of an ongoing video communication; a loudspeaker, arranged to emit sound content provided to the participant client 121 as a part of said video communication; a video camera; and a microphone, arranged to record sound locally to a human participant 122 to said video communication, the participant 122 using the participant client 121 in question to participate in said video communication.

In other words, a respective human-machine interface of each participating client 121 allows a respective participant 122 to interact with the client 121 in question, in a video communication, with other participants and/or audio/video streams provided by various sources.

In general, each of the participating clients 121 comprises a respective input means 123, that may comprise said video camera; said microphone; a keyboard; a computer mouse or trackpad; and/or an API to receive a digital video stream, a digital audio stream and/or other digital data. The input means 123 is specifically arranged to receive a video stream and/or an audio stream from a central server, such as the video communication service 110 and/or the central server 130, such a video stream and/or audio stream being provided as a part of a video communication and preferably being produced based on corresponding digital data input streams provided to said central server from at least two sources of such digital data input streams, for instance participant clients 121 and/or external sources (see below).

Further generally, each of the participating clients 121 comprises a respective output means 124, that may comprise said computer screen; said loudspeaker; and an API to emit a digital video and/or audio stream, such stream being representative of a captured video and/or audio locally to the participant 122 using the participant client 121 in question.

In practice, each participant client 121 may be a mobile device, such as a mobile phone, arranged with a screen, a loudspeaker, a microphone and an internet connection, the mobile device executing computer software locally or accessing remotely executed computer software to perform the functionality of the participant client 121 in question. Correspondingly, the participant client 121 may also be a thick or thin laptop or stationary computer, executing a locally installed application, using a remotely accessed functionality via a web browser, and so forth, as the case may be.

There may be more than one, such as at least three or even at least four, participant clients 121 used in one and the same video communication of the present type.

There may be at least two different groups of participating clients. Each of the participating clients may be allocated to such a respective group. The groups may reflect different roles of the participating clients, different virtual or physical locations of the participating clients and/or different interaction rights of the participating clients.

Various available such roles may be, for instance, "leader" or "conferencier", "speaker", "panel participant", "interacting audience" or "remote listener".

Various available such physical locations may be, for instance, "on the stage", "in the panel", "in the physically present audience" or "in the physically remote audience".

A virtual location may be defined in terms of the physical location, but may also involve a virtual grouping that may partly overlap with said physical locations. For instance, a physically present audience may be divided into a first and a second virtual group, and some physically present audience participants may be grouped together with some physically distant audience participants in one and the same virtual group.

Various available such interaction rights may be, for instance, "full interaction" (no restrictions), "can talk but only after requesting the microphone" (such as raising a virtual hand in a video conference service), "cannot talk but write in common chat" or "view/listen only".

In some instances, each role defined and/or physical/virtual location may be defined in terms of certain predetermined interaction rights. In other instances, all participants having the same interaction rights form a group. Hence, any defined roles, locations and/or interaction rights may reflect various group allocations, and different groups may be disjoint or overlapping, as the case may be.

This will be exemplified below.

The video communication may be provided at least partly by the video communication service 110 and at least partly by the central server 130, as will be described and exemplified herein.

As the term is used herein, a "video communication" is an interactive, digital communication session involving at least two, preferably at least three or even at least four, video streams, and preferably also matching audio streams that are used to produce one or several mixed or joint digital video/audio streams that in turn is or are consumed by one or several consumers (such as participant clients of the discussed type), that may or may not also be contributing to the video communication via video and/or audio. Such a video communication is real-time, with or without a certain latency or delay. At least one, preferably at least two, or even at least four, participants 122 to such a video communication is involved in the video communication in an interactive manner, both providing and consuming video/audio information.

At least one of the participant clients 121, or all of the participant clients 121, may comprise a local synchronisation software function 125, that will be described in closer detail below.

The video communication service 110 may comprise or have access to a common time reference, as will also be described in closer detail below.

Each of the at least one central server 130 may comprise a respective API 137, for digitally communicating with entities external to the central server 130 in question. Such communication may involve both input and output.

The system 100, such as said central server 130, may furthermore be arranged to digitally communicate with, and in particular to receive digital information, such as audio and/or video stream data, from, an external information source 300, such as an externally provided video stream. That the information source 300 is "external" means that it is not provided from or as a part of the central server 130. Preferably, the digital data provided by the external information source 300 is independent of the central server 130, and the central server 130 cannot affect the information contents thereof. For instance, the external information source 130 may be live captured video and/or audio, such as of a public sporting event or an ongoing news event or reporting. The external information source 130 may also be captured by a web camera or similar, but not by any one of the participating clients 121. Such captured video may hence depict the same locality as any one of the participant clients 121, but not be captured as a part of the activity of the participant client 121 per se. One possible difference between an externally provided information source 300 and an internally provided information source 120 is that internally provided information sources may be provided as, and in their capacity as, participants to a video communication of the above-defined type, whereas an externally provided information source 300 is not, but is instead provided as a part of a context that is external to said video conference There may also be several external information sources 300, that provide digital information of said type, such as audio and/or video streams, to the central server 130 in parallel.

As shown in FIG. 1, each of the participating clients 121 may constitute the source of a respective information (video and/or audio) stream 120, provided to the video communication service 110 by the participating client 121 in question as described.

The system 100, such as the central server 130, may be further arranged to digitally communicate with, and in particular to emit digital information to, an external consumer 150. For instance, a digital video and/or audio stream produced by the central server 130 may be provided continuously, in real-time or near real-time, to one or several external consumers 150 via said API 137. Again, that the consumer 150 is "external" means that the consumer 150 is not provided as a part of the central server 130, and/or that it is not a party to the said video communication.

Unless not stated otherwise, all functionality and communication herein is provided digitally and electronically, effected by computer software executing on suitable computer hardware and communicated over a digital communication network or channel such as the internet.

Hence, in the system 100 configuration illustrated in FIG. 1, a number of participant clients 121 take part in a digital video communication provided by the video communication service 110. Each participant client 121 may hence have an ongoing login, session or similar to the video communication service 110, and may take part in one and the same ongoing video communication provided by the video communication service 110. In other words, the video communication is "shared" among the participant clients 121 and therefore also by corresponding human participants 122.

In FIG. 1, the central server 130 comprises an automatic participant client 140, being an automated client corresponding to participant clients 121 but not associated with a human participant 122. Instead, the automatic participant client 140 is added as a participant client to the video communication service 110 to take part in the same shared video communication as participant clients 121. As such a participant client, the automatic participant client 140 is granted access to continuously produced digital video and/or audio stream(s) provided as a part of the ongoing video communication by the video communication service 110, and can be consumed by the central server 130 via the automatic participant client 140. Preferably, the automatic participant client 140 receives, from the video communication service 110, a common video and/or audio stream that is or may be distributed to each participant client 121; a respective video and/or audio stream provided to the video communication service 110 from each of one or several of the participant clients 121 and relayed, in raw or modified form, by the video communication service 110 to all or requesting participant clients 121; and/or a common time reference.

The central server 130 may comprise a collecting function 131 arranged to receive video and/or audio streams of said type from the automatic participant client 140, and possibly also from said external information source(s) 300, for processing as described below, and then to provide a produced, such as shared, video stream via the API 137. For instance, this produced video stream may be consumed by the external consumer 150 and/or by the video communication service 110 to in turn be distributed by the video communication service 110 to all or any requesting one of the participant clients 121.

FIG. 2 is similar to FIG. 1, but instead of using the automatic client participant 140 the central server 130 receives video and/or audio stream data from the ongoing video communication via an API 112 of the video communication service 110.

FIG. 3 is also similar to FIG. 1, but shows no video communication service 110. In this case, the participant clients 121 communicate directly with the API 137 of the central server 130, for instance providing video and/or audio stream data to the central server 130 and/or receiving video and/or audio stream data from the central server 130. Then, the produced shared stream may be provided to the external consumer 150 and/or to one or several of the client participants 121.

FIG. 4 illustrates the central server 130 in closer detail. As illustrated, said collecting function 131 may comprise one or, preferably, several, format-specific collecting functions 131a. Each one of said format-specific collecting functions 131a may be arranged to receive a video and/or audio stream having a predetermined format, such as a predetermined binary encoding format and/or a predetermined stream data container, and may be specifically arranged to parse binary video and/or audio data of said format into individual video frames, sequences of video frames and/or time slots.

The central server 130 may further comprise an event detection function 132, arranged to receive video and/or audio stream data, such as binary stream data, from the collecting function 131 and to perform a respective event detection on each individual one of the received data streams. The event detection function 132 may comprise an AI (Artificial Intelligence) component 132a for performing said event detection. The event detection may take place without first time-synchronising the individual collected streams.

The central server 130 further comprises a synchronising function 133, arranged to time-synchronise the data streams provided by the collecting function 131 and that may have been processed by the event detection function 132. The synchronising function 133 may comprise an AI component 133a for performing said time-synchronisation.

The central server 130 may further comprise a pattern detection function 134, arranged to perform a pattern detection based on the combination of at least one, but in many cases at least two, such as at least three or even at least four, such as all, of the received data streams. The pattern detection may be further based on one, or in some cases at least two or more, events detected for each individual one of said data streams by the event detection function 132. Such detected events taking into consideration by said pattern detection function 134 may be distributed across time with respect to each individual collected stream. The pattern detection function 134 may comprise an AI component 134a for performing said pattern detection. The pattern detection may further be based on the above-discussed grouping, and in particular be arranged to detect a particular pattern occurring only with respect to one group; with respect to only some but not all groups; or with respect to all groups.

The central server 130 further comprises a production function 135, arranged to produce a produced digital video stream, such as a shared digital video stream, based on the data streams provided from the collecting function 131, and possibly further based on any detected events and/or patterns. Such a produced video stream may at least comprise a video stream produced to comprise one or several of video streams provided by the collecting function 131, raw, reformatted or transformed, and may also comprise corresponding audio stream data. As will be exemplified below, there may be several produced video streams, where one such produced video stream may be produced in the above-discussed way but further based on a another already produced video stream.

All produced video streams are preferably produced continuously, and preferably in near real-time (after discounting any latencies and delays of the types discussed hereinbelow).

The central server 130 may further comprise a publishing function 136, arranged to publish the produced digital video stream in question, such as via API 137 as described above.

It is noted that FIGS. 1, 2 and 3 illustrate three different examples of how the central server 130 can be used to implement the principles described herein, and in particular to provide a method according to the present invention, but that other configurations, with or without using one or several video communication services 110, are also possible.

Hence, FIG. 5 illustrates a method for providing said produced digital video stream. FIGS. 6a-6f illustrates different digital video/audio data stream states resulting from the method steps illustrated in FIG. 5.

In a first step, the method starts.

In a subsequent collecting step, respective primary digital video streams 210, 301 are collected, such as by said collecting function 131, from at least two of said digital video sources 120, 300. Each such primary data stream 210, 301 may comprise an audio part 214 and/or a video part 215. It is understood that "video", in this context, refers to moving and/or still image contents of such a data stream. Each primary data stream 210, 301 may be encoded according to any video/audio encoding specification (using a respective codec used by the entity providing the primary stream 210, 301 in question), and the encoding formats may be different across different ones of said primary streams 210, 301 concurrently used in one and the same video communication. It is preferred that at least one, such as all, of the primary data streams 210, 301 is provided as a stream of binary data, possibly provided in a per se conventional data container data structure. It is preferred that at least one, such as at least two, or even all of the primary data streams 210, 301 are provided as respective live video recordings.

It is noted that the primary streams 210, 301 may be unsynchronised in terms of time when they are received by the collecting function 131. This may mean that they are associated with different latencies or delays in relation to each other. For instance, in case two primary video streams 210, 301 are live recordings, this may imply that they are associated, when received by the collecting function 131, with different latencies with respect to the time of recording.

It is also noted that the primary streams 210, 301 may themselves be a respective live camera feed from a web camera; a currently shared screen or presentation; a viewed film clip or similar; or any combination of these arranged in various ways in one and the same screen.

Figure 6A:
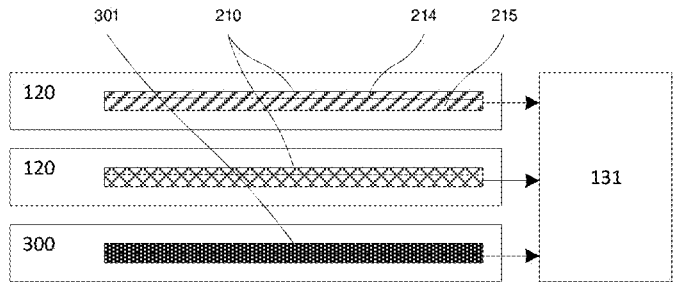
Figure 6B:
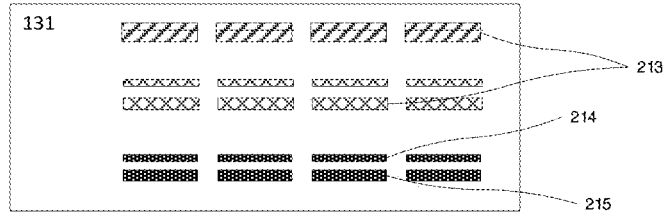

The collecting step is shown in FIGS. 6a and 6b. In FIG. 6b, it is also illustrated how the collecting function 131 can store each primary video stream 210, 301 as bundled audio/video information or as audio stream data separated from associated video stream data. FIG. 6b illustrates how the primary video stream 210, 301 data is stored as individual frames 213 or collections/clusters of frames, "frames" here referring to time-limited parts of image data and/or any associated audio data, such as each frame being an individual still image or a consecutive series of images (such as such a series constituting at the most 1 second of moving images) together forming moving-image video content.

Figure 6C:
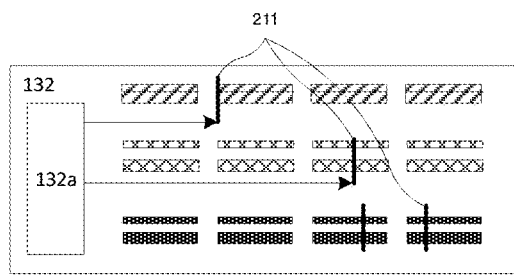

In a subsequent event detection step, performed by the event detection function 132, said primary digital video streams 210, 301 are analysed, such as by said event detection function 132 and in particular said AI component 132a, to detect at least one event 211 selected from a first set of events. This is illustrated in FIG. 6c.

It is preferred that this event detections step may be performed for at least one, such as at least two, such as all, primary video streams 210, 301, and that it may be performed individually for each such primary video stream 210, 301. In other words, the event detection step preferably takes place for said individual primary video stream 210, 301 only taking into consideration information contained as a part of that particular primary video stream 210, 301 in question, and particularly without taking into consideration information contained as a part of other primary video streams. Furthermore, the event detection preferably takes place without taking into consideration any common time reference 260 associated with the several primary video streams 210, 301.

On the other hand, the event detection preferably takes into consideration information contained as a part of the individually analysed primary video stream in question across a certain time interval, such as a historic time interval of the primary video stream that is longer than 0 seconds, such as at least 0.1 seconds, such as at least 1 second.

The event detection may take into consideration information contained in audio and/or video data contained as a part of said primary video stream 210, 301.

Said first set of events may contain any number of types of events, such as a change of slides in a slide presentation constituting or being a part of the primary video stream 210, 301 in question; a change in connectivity quality of the source 120, 300 providing the primary video stream 210, 301 in question, resulting in an image quality change, a loss of image data or a regain of image data; and a detected movement physical event in the primary video stream 210, 301 in question, such as the movement of a person or object in the video, a change of lighting in the video, a sudden sharp noise in the audio or a change of audio quality. It is realised that this is not intended to be an exhaustive list, but that these examples are provided in order to understand the applicability of the presently described principles.

Figure 6D:
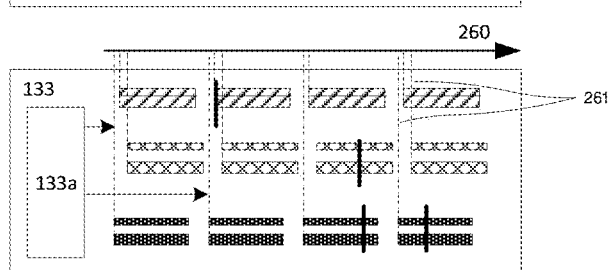

In a subsequent synchronising step, performed by the synchronisation function 133, the primary digital video streams 210 are time-synchronised. This time-synchronisation may be with respect to a common time reference 260. As illustrated in FIG. 6d, the time-synchronisation may involve aligning the primary video streams 210, 301 in relation to each other, for instance using said common time reference 260, so that they can be combined to form a time-synchronised context. The common time reference 260 may be a stream of data, a heartbeat signal or other pulsed data, or a time anchor applicable to each of the individual primary video streams 210, 301. The common time reference can be applied to each of the individual primary video streams 210, 301 in a way so that the informational contents of the primary video stream 210, 301 in question can be unambiguously related to the common time reference with respect to a common time axis. In other words, the common time reference may allow the primary video streams 210, 301 to be aligned, via time shifting, so as to be time-synchronised in the present sense. In other embodiments, the time-synchronisation may be based on known information about a time difference between the primary video streams 210, 301 in question, such as based on measurements.

As illustrated in FIG. 6d, the time-synchronisation may comprise determining, for each primary video streams 210, 301, one or several timestamps 261, such as in relation to the common time reference 260 or for each video stream 210, 301 in relation to another video stream 210, 301 or to other video streams 210, 301.

Figure 6E:
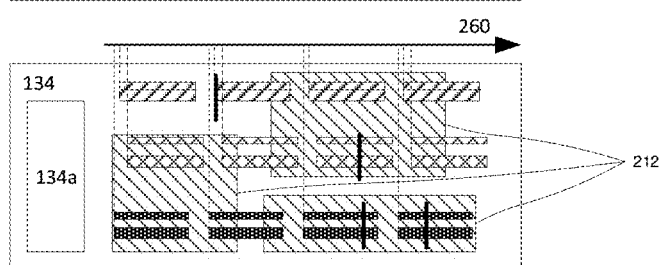

In a subsequent pattern detection step, performed by the pattern detection function 134, the hence time-synchronised primary digital video streams 210, 301 are analysed to detect at least one pattern 212 selected from a first set of patterns. This is illustrated in FIG. 6e.

In contrast to the event detection step, the pattern detection step may preferably be performed based on video and/or audio information contained as a part of at least two of the time-synchronised primary video streams 210, 301 considered jointly.

Said first set of patterns may contain any number of types of patterns, such as several participants talking interchangeably or concurrently; or a presentation slide change occurring concurrently as a different event, such as a different participant talking. This list is not exhaustive, but illustrative.

In alternative embodiments, detected patterns 212 may relate not to information contained in several of said primary video streams 210, 301 but only in one of said primary video streams 210, 301. In such cases, it is preferred that such pattern 212 is detected based on video and/or audio information contained in that single primary video stream 210, 301 spanning across at least two detected events 211, for instance two or more consecutive detected presentation slide changes or connection quality changes. As an example, several consecutive slide changes that follow on each other rapidly over time may be detected as one single slide change pattern, as opposed to one individual slide change pattern for each detected slide change event.

It is realised that the first set of events and said first set of patterns may comprise events/patterns being of predetermined types, defined using respective sets of parameters and parameter intervals. As will be explained below, the events/patterns in said sets may also, or additionally, be defined and detected using various AI tools.

In a subsequent production step, performed by the production function 135, the shared digital video stream is produced as an output digital video stream 230 based on consecutively considered frames 213 of the time-synchronised primary digital video streams 210, 301 and said detected patterns 212.

As will be explained and detailed in the following, the present invention allows for the completely automatic production of video streams, such as of the output digital video stream 230.

For instance, such production may involve the selection of what video and/or audio information from what primary video stream 210, 301 to use to what extent in such output video stream 230; a video screen layout of an output video stream 230; a switching pattern between different such uses or layouts across time; and so forth.

Figure 6F:
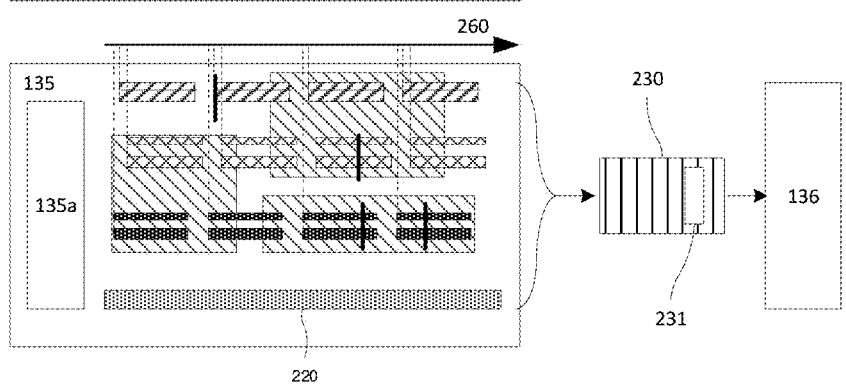

This is illustrated in FIG. 6f, that also shows one or several additional pieces of time-related (that may be related to the common time reference 260) digital video information 220, such as an additional digital video information stream, that can be time-synchronised (such as to said common time reference 260) and used in concert with the time-synchronised primary video streams 210, 301 in the production of the output video stream 230. For instance, the additional stream 220 may comprise information with respect to any video and/or audio special effects to use, such as dynamically based on detected patterns; a planned time schedule for the video communication; and so forth.

In a subsequent publishing step, performed by the publishing function 136, the produced output digital video stream 230 is continuously provided to a consumer 110, 150 of the produced digital video stream as described above. The produced digital video stream may be provided to one or several participant clients 121, such as via the video communication service 110.

In a subsequent step, the method ends. However, first the method may iterate any number of times, as illustrated in FIG. 5, to produce the output video stream 230 as a continuously provided stream. Preferably, the output video stream 230 is produced to be consumed in real-time or near real-time (taking into consideration a total latency added by all steps along the way), and continuously (publishing taking place immediately when more information is available, however not counting the below-described deliberately added latencies or delays). This way, the output video stream 230 may be consumed in an interactive manner, so that the output video stream 230 may be fed back into the video communication service 110 or into any other context forming a basis for the production of a primary video stream 210 again being fed to the collection function 131 so as to form a closed feedback loop; or so that the output video stream 230 may be consumed into a different (external to system 100 or at least external to the central server 130) context but there forming the basis of a real-time, interactive video communication.

As mentioned above, in some embodiments at least two, such as at least three, such as at least four, or even at least five, of said primary digital video streams 210, 301 are provided as a part of a shared digital video communication, such as provided by said video communication service 110, the video communication involving a respective remotely connected participant client 121 providing the primary digital video stream 210 in question. In such cases, the collecting step may comprise collecting at least one of said primary digital video streams 210 from the shared digital video communication service 110 itself, such as via an automatic participant client 140 in turn being granted access to video and/or audio stream data from within the video communication service 110 in question; and/or via an API 112 of the video communication service 110.

Moreover, in this and in other cases the collecting step may comprise collecting at least one of said primary digital video streams 210, 301 as a respective external digital video stream 301, collected from an information source 300 being external to the shared digital video communication service 110. It is noted that one or several used such external video sources 300 may also be external to the central server 130.

In some embodiments, the primary video streams 210, 301 are not formatted in the same manner. Such different formatting can be in the form of them being delivered to the collecting function 131 in different types of data containers (such as AVI or MPEG), but in preferred embodiments at least one of the primary video streams 210, 301 is formatted according to a deviating format (as compared to at least one other of said primary video streams 210, 301) in terms of said deviating primary digital video stream 210, 301 having a deviating video encoding; a deviating fixed or variable frame rate; a deviating aspect ratio; a deviating video resolution; and/or a deviating audio sample rate.

It is preferred that the collecting function 131 is preconfigured to read and interpret all encoding formats, container standards, etc. that occur in all collected primary video streams 210, 301. This makes it possible to perform the processing as described herein, not requiring any decoding until relatively late in the process (such as not until after the primary stream in question is put in a respective buffer; not until after the event detection step; or even not until after the event detection step). However, in the rare case in which one or several of the primary video feeds 210, 301 are encoded using a codec that the collecting function 131 cannot interpret without decoding, the collecting function 131 may be arranged to perform a decoding and analysis of such primary video stream 210, 301, followed by a conversion into a format that can be handled by, for instance, the event detection function. It is noted that, even in this case, it is preferred not to perform any reencoding at this stage.

For instance, primary video streams 220 being fetched from multi-party video events, such as one provided by the video communication service 110, typically have requirements on low latency and are therefore typically associated with variable framerate and variable pixel resolution to enable participants 122 to have an effective communication. In other words, overall video and audio quality will be decreased as necessary for the sake of low latency.

External video feeds 301, on the other hand, will typically have a more stable framerate, higher quality but therefore possibly higher latency.

Hence, the video communication service 110 may, at each moment in time, use a different encoding and/or container than the external video source 300. The analysis and video production process described herein in this case therefore needs to combine these streams 210, 301 of different formats into a new one for the combined experience.

As mentioned above, the collecting function 131 may comprise a set of format-specific collecting functions 131a, each one arranged to process a primary video stream 210, 301 of a particular type of format. For instance, each one of these format-specific collecting functions 131a may be arranged to process primary video streams 210, 301 having been encoded using a different video respective encoding method/codec, such as Windows® Media® or Divx®.

However, in preferred embodiments the collecting step comprises converting at least two, such as all, of the primary digital video streams 210, 301 into a common protocol 240.

As used in this context, the term "protocol" refers to an information-structuring standard or data structure specifying how to store information contained in a digital video/audio stream. The common protocol preferably does not, however, specify how to store the digital video and/or audio information as such on a binary level (i.e. the encoded/compressed data instructive of the sounds and images themselves), but instead forms a structure of predetermined format for storing such data. In other words, the common protocol prescribes storing digital video data in raw, binary form without performing any digital video decoding or digital video encoding in connection to such storing, possibly by not at all amending the existing binary form apart from possibly concatenating and/or splitting apart the binary form byte sequence. Instead, the raw (encoded/compressed) binary data contents of the primary video stream 210, 301 in question is kept, while repacking this raw binary data in the data structure defined by the protocol. In some embodiments, the common protocol defines a video file container format.

FIG. 7 illustrates, as an example, the primary video streams 210, 301 shown in FIG. 6a, restructured by the respective format-specific collecting function 131a and using said common protocol 240.

Hence, the common protocol 240 prescribes storing digital video and/or audio data in data sets 241, preferably divided into discreet, consecutive sets of data along a time line pertaining to the primary video stream 210, 301 in question. Each such data set may include one or several video frames, and also associated audio data.

The common protocol 240 may also prescribe storing metadata 242 associated with specified time points in relation to the stored digital video and/or audio data sets 241.

The metadata 242 may comprise information about the raw binary format of the primary digital video stream 210 in question, such as regarding a digital video encoding method or codec used to produce said raw binary data; a resolution of the video data; a video frame rate; a frame rate variability flag; a video resolution; a video aspect ratio; an audio compression algorithm; or an audio sampling rate. The metadata 242 may also comprise information on a timestamp of the stored data, such as in relation to a time reference of the primary video stream 210, 301 in question as such or to a different video stream as discussed above.

Using said format-specific collecting functions 131a in combination with said common protocol 240 makes it possible to quickly collect the informational contents of the primary video streams 210, 301 without adding latency by decoding/reencoding the received video/audio data.

Hence, the collecting step may comprise using different ones of said format-specific collecting functions 131a for collecting primary digital video streams 210, 301 being encoded using different binary video and/or audio encoding formats, in order to parse the primary video stream 210, 301 in question and store the parsed, raw and binary data in a data structure using the common protocol, together with any relevant metadata. Self-evidently, the determination as to what format-specific collecting function 131a to use for what primary video stream 210, 301 may be performed by the collecting function 131 based on predetermined and/or dynamically detected properties of each primary video stream 210, 301 in question.

Each hence collected primary video stream 210, 301 may be stored in its own separate memory buffer, such as a RAM memory buffer, in the central server 130.

The converting of the primary video streams 210, 301 performed by each format-specific collecting function 131a may hence comprise splitting raw, binary data of each thus converted primary digital video stream 210, 301 into an ordered set of said smaller sets of data 241.

Moreover, the converting may also comprise associating each (or a subset, such as a regularly distributed subset along a respective time line of the primary stream 210, 301 in question) of said smaller sets 241 with a respective time along a shared time line, such as in relation to said common time reference 260. This associating may be performed by analysis of the raw binary video and/or audio data in any of the principle ways described below, or in other ways, and may be performed in order to be able to perform the subsequent time-synchronising of the primary video streams 210, 301. Depending on the type of common time reference used, at least part of this association of each of the data sets 241 may also or instead be performed by the synchronisation function 133. In the latter case, the collecting step may instead comprise associating each, or a subset, of the smaller sets 241 with a respective time of a time line specific for the primary stream 210, 301 in question.

In some embodiments, the collecting step also comprises converting the raw binary video and/or audio data collected from the primary video streams 210, 301 into a uniform quality and/or updating frequency. This may involve downsampling or up-sampling of said raw, binary digital video and/or audio data of the primary digital video streams 210, 301, as necessary, to a common video frame rate; a common video resolution; or a common audio sampling rate. It is noted that such re-sampling can be performed without performing a full decoding/reencoding, or even without performing any decoding at all, since the format-specific collecting function 131a in question can process the raw binary data directly according to the correct binary encoding target format.

Each of said primary digital video streams 210, 301 may be stored in an individual data storage buffer 250, as individual frames 213 or sequences of frames 213 as described above, and also each associated with a corresponding time stamp in turn associated with said common time reference 260.

In a concrete example, provided to illustrate these principles, the video communication service 110 is Microsoft® Teams®, running a video conference involving concurrent participants 122. The automatic participant client 140 is registered as a meeting participant in the Teems® meeting.

Then, the primary video input signals 210 are available to and obtained by the collecting function 130 via the automatic participant client 140. These are raw signals in H264 format and contain timestamp information for every video frame.

The relevant format-specific collecting function 131*a* picks up the raw data over IP (LAN network in the cloud) on a configurable predefined TCP port. Every Teems® meeting participant, as well as associated audio data, are associated with a separate port. The collecting function 131 then uses the timestamps from the audio signal (which is in 50 Hz) and down-samples the video data to a fixed output signal of 25 Hz before storing the video stream 220 in its respective individual buffer 250.

As mentioned, the common protocol 240 may store the data in raw binary form. It can be designed to be very low-level, and to handle the raw bits and bytes of the video/audio data. In preferred embodiments, the data is stored in the common protocol 240 as a simple byte array or corresponding data structure (such as a slice). This means that the data does not need to be put in a conventional video container at all (said common protocol 240 not constituting such conventional container in this context). Also, encoding and decoding video is computationally heavy, which means it causes delays and requires expensive hardware.

Moreover, this problem scales with the number of participants.

Using the common protocol 240, it becomes possible to reserve memory in the collecting function 131 for the primary video stream 210 associated with each Teams® meeting participant 122, and also for any external video sources 300, and then to change the amount of memory allocated on the fly during the process. This way, it becomes possible to change the number of input streams and as a result keep each buffer effective. For instance, since information like resolution, framerate and so forth may be variable but stored as metadata in the common protocol 240, this information can be used to quickly resize each buffer as need may be.

The following is an example of a specification of a common protocol 240 of the present type:

| Bytes | Example | Description |
|---|---|---|
| 1 byte | 1 | 0 = video; 1 = audio |
| 4 bytes | 1234567 | Buffer Length (int) |
| 8 bytes | 424234234 | Timestamp from the invoming audio/video buffer Measured in ticks, 1tick = 100 ns. (long int) |
| 1 byte | 0 | VideoColorFormat { NV12 = 0, Rgb24 = 1, Yuy2 = 2, H264 = 3 } |
| 4 bytes | 720 | Video frame pixel height (int) |
| 4 bytes | 640 | Video frame pixel width (int) |
| 4 bytes | 25.0 | Video frame rate Number of frames per second (float) |
| 1 byte | 0 | Is audio silence? 1 = true; 0 = false |
| 1 byte | 0 | AudioFormat { 0 = Pcm16K 1 = Pcm44KStereo } |
| 1 byte | 0 | Detected event in, if any 0 = no event 1, 2, 3, etc. = event of specified type detected |
| 30 bytes | | Reserved for future use |
| 8 bytes | 1000000 | Length of binary data in bytes (long int) |
| Variable | 0 x 87A879 . . . | Raw binary video/audio data of this frame(s) |

-continued

| Bytes | Example | Description |
|---|---|---|
| 4 bytes | 1234567 | Dominant speaker Port |
| 4 bytes | 1234567 | Active speaker |

Above, the "Detected event in, if any" data is included as a part of the common protocol 260 specification. However, in some embodiments, this information (regarding detected events) may instead be put in a separate memory buffer.

In some embodiments, said at least one additional piece of digital video information 220, that may be an overlay or an effect, is also stored in a respective individual buffer 250, as individual frames or sequences of frames each associated with a corresponding time stamp in turn associated with said common time reference 260.

As exemplified above, the event detection step may comprise storing, using said common protocol 240, metadata 242 descriptive of a detected event 211, associated with the primary digital video stream 210, 301 in which the event 211 in question was detected.

The event detection can be performed in different ways. In some embodiments, performed by the AI component 132*a*, the event detection step comprises a first trained neural network or other machine learning component analysing at least one, such as several or even all, of said primary digital video streams 210, 301 individually in order to automatically detect any of said events 211. This may involve the AI component 132*a* classifying, in a managed classification, the primary video stream 210, 301 data into a set of predefined events and/or, in an unmanaged classification, into a dynamically determined set of events.

In some embodiments, the detected event 211 is a change of presentation slides in a presentation being or being comprised in the primary video stream 210, 301 in question.

For instance, if the presenter of the presentation decides to change the slide in the presentation he/she is giving at that time to an audience, this means that what is interesting for a given viewer can change. It may be that the newly shown slide is only a high level picture that can best be seen briefly in a so-called "butterfly" mode (for instance, displaying in the output video stream 230 the slide side-by-side with a video of the presenter). Alternatively, the slide may contain much detail, text with small font sizes, and so forth. In this latter case, the slide should instead be presented in full-screen and perhaps during a somewhat longer time period than what is usually the case. A butterfly mode may not be as appropriate, since the slide in this case may be more interesting to a viewer of the presentation than the face of the presenter.

In practice, the event detection step may comprise at least one of the following:

Firstly, the event 211 can be detected based on an image analysis of a difference between a first image of a detected slide and a subsequent second image of a detected slide. The nature of the primary video stream 220, 301 being that of showing a slide can be automatically determined using per se conventional digital image processing, such as using motion detection in combination with OCR (Optical Character Recognition).

This may involve checking, using automatic computer image processing techniques, whether the detected slide has changed significantly enough to actually categorise it as a slide change. This may be done by checking the delta between current slide and previous slide with respect to RGB colour values. For instance, one may assess how much the RGB values have changed globally in the screen area covered by the slide in question, and whether it is possible to find groups of pixels that belong together and that change in concert. This way, relevant slide changes can be detected while, for instance, filtering out irrelevant changes such as shown computer mouse movements across the screen. This approach also allows full configurability—for instance, sometimes it is desired to be able to capture computer mouse movement, for instance when the presenter wishes to present something in detail using the computer mouse to point to different things.

Secondly, the event 211 may be detected based on an image analysis of an informational complexity of said second image itself, to determine the type of event with greater specificity.

This may, for instance, involve assessing a total amount of textual information on the slide in question, as well as associated font sizes. This may be done by using conventional OCR methods, such as deep learning-based character recognition techniques.

It is noted that, since the raw binary format of the assessed video stream 210, 301 is known, this may be performed directly in the binary domain, without first decoding or reencoding the video data. For instance, the event detection function 132 may call the relevant format-specific collecting function for image interpreting services, or the event detection function 132 may itself include functionality for assessing image information, such as on individual pixel level, for a number of different supported raw binary video data formats.

In another example, the detected event 211 is a loss of communication connection of a participant client 121 to a digital video communication service 110. Then, the detection step may comprise detecting that said participant client 121 has lost communication connection based on an image analysis of a series of subsequent video frames 213 of a primary digital video stream 210 corresponding to the participant client 121 in question.

Because participant clients 121 are associated with different physical locations and different internet connections, it can happen that someone will lose connection to the video communication service 110 or to the central server 130. In that situation, it is desirable to avoid showing a black or empty screen in the produced output video stream 230.

Instead, such connection loss can be detected as an event by the event detection function 132, such as by applying a 2-class classification algorithm where the 2 classes used are connected/not connected (no data). In this case, it is understood that "no data" differs from the presenter sending out a black screen intentionally. Because a brief black screen, such as of only 1 or 2 frames, may not be noticeable in the end production stream 230, one may apply said 2-class classification algorithm over time to create a time series. Then, a threshold value, specifying a minimum length for a connection interruption, can be used to decide whether there is a lost connection or not.

As will be explained in the following, detected events of these exemplified types may be used by the pattern detection function 134 to take various actions, as suitable and desired.

As mentioned, the individual primary video streams 210, 301 may each be related to the common time reference 260 or to each other in the time domain, making it possible for the synchronisation function 133 to time-synchronise them in relation to each other.

In some embodiments, the common time reference 260 is based on or comprises a common audio signal 111 (see FIGS. 1-3), the common audio signal 111 being common for the shared digital video communication service 110 involving at least two remotely connected participant clients 121 as described above, each providing a respective one of said primary digital video streams 210.

In the example of Microsoft® Teams® discussed above, a common audio signal is produced and can be captured by the central server 130 via the automatic participant client 140 and/or via the API 112. In this and in other examples, such a common audio signal may be used as a heartbeat signal to time-synchronise the individual primary video streams 220 by binding each of these to specific time points based on this heartbeat signal. Such a common audio signal may be provided as a separate (in relation to each of the other primary video streams 210) signal, whereby the other primary video streams 210 may each be individually time-correlated to the common audio signal, based on audio contained in the other primary video stream 210 in question or even based on image information contained therein (such as using automatic image processing-based lip syncing techniques).

In other words, to handle any variable and/or differing latency associated with individual primary video streams 210, and to achieve time-synchronisation for the combined video output stream 230, such a common audio signal is used as a heartbeat for all primary video streams 210 in the central server 130 (but perhaps not external primary video streams 301). In other words, all other signals are mapped to this common audio time heartbeat to make sure that everything is in time sync.

In a different example, the time-synchronisation is achieved using a time synchronisation element 231 introduced into the output digital video stream 230 and detected by a respective local time-synchronising software function 125 provided as a part of one or several individual ones of the participant clients 121, the local software function 125 being arranged to detect a time of arrival of the time synchronisation element 231 in the output video stream 230. As is understood, in such embodiments the output video stream 230 is fed back into the video communication service 110 or otherwise made available to each participant client 121 and the local software function 125 in question.

For instance, the time synchronisation element 231 may be a visual marker, such as a pixel changing colours in a predetermined sequence or manner, placed or updated in the output video 230 at regular time intervals; a visual clock updated and displayed in the output video 230; a sound signal (that may be designed to be non-audible to participants 122 by, for instance, having low enough amplitude and/or high enough frequency) and added to an audio forming part of the output video stream 230. The local software function 125 is arranged to, using suitable image and/or audio processing, automatically detect respective times of arrival of each of the (or each of the) time synchronisation element(s) 231.

Then, the common time reference 260 may be determined at least party based on said detected times of arrival. For instance, each of the local software functions 125 may communicate to the central server 130 respective information signifying said detected time of arrival.

Such communication may take place via a direct communication link between the participant client 121 in question and the central server 130. However, the communication may also take place via the primary video stream 210 associated with the participant client 121 in question. For instance, the participating client 121 may introduce a visual or audible code, such as of the above discussed type, in the primary video stream 210 produced by that participant client 121 in question, for automatic detection by the central server 130 and used to determine the common time reference 260.

In yet additional examples, each participant client 121 may perform an image detection in a common video stream available for viewing by all participant clients 121 to the video communication service 110 and relay the results of such image detection to the central server 130, in a way corresponding to the ones discussed above, to there be used to over time determine respective offsets of each participant client 121 in relation to each other. This way, a common time reference 260 may be determined as a set of individual relative offsets. For instance, a selected reference pixel of a commonly available video stream may be monitored by several, or all, participating clients 121, such as by said local software function 125, and a current colour of that pixel may be communicated to the central server 130. The central server 130 may calculate a respective time series based on consecutively received such colour values from each of a number of (or all) the participant clients 121, and perform a cross-correlation resulting in an estimated set of relative time offsets across the different participant clients 121.

In practice, the output video stream 230 fed into the video communication service 110 may be included as a part of a shared screen every participant client of the video communication in question, and may therefore be used to assess such time offset associated with the participant clients 121. In particular, the output video stream 230 fed to the video communication service 110 may be available again to the central server via the automatic participant client 140 and/or the API 112.

In some embodiments, a common time reference 260 may be determined at least partly based on a detected discrepancy between an audio part 214 of a first one of said primary digital video streams 210, 301 and an image part 215 of said first primary digital video streams 210, 301. Such discrepancy may, for instance, be based on a digital lip sync video image analysis of a talking participant 122 viewed in said first primary digital video stream 210, 301 in question. Such lip sync analysis is conventional as such, and may for instance use a trained neural network. The analysis may be performed by the synchronisation function 133 for each primary video stream 210, 301 in relation to available common audio information, and relative offsets across the individual primary video streams 210, 301 may be determined based on this information.

In some embodiments, the synchronisation step comprises deliberately introducing a delay (in this context the terms "delay" and "latency" are intended to mean the same thing) of at the most 30 seconds, such as at the most 5 seconds, such as at the most 1 seconds, such as at the most 0.5 seconds, but longer than 0 s, so that the output digital video stream 230 is provided at least with said delay. At any rate, the deliberately introduced delay is at least several video frames, such as at least three, or even at least five or even 10, video frames, such as this number of frames (or individual images) stored after any resampling in the collecting step. As used herein, the term "deliberately" means that the delay is introduced irrespective of any need for introducing such a delay based on synchronisation issues or similar. In other words, the deliberately introduced delay is introduced in addition to any delay introduced as a part of the synchronisation of the primary video streams 210, 301 in order to time-synchronise them one in relation to the other. The deliberately introduced delay may be predetermined, fixed or variable in relation to the common time reference 260. The delay time may be measured in relation to a least latent one of the primary video streams 210, 301, so that more latent ones of these streams 210, 301 as a result of said time-synchronisation are associated with a relatively smaller deliberately added delay.

In some embodiments, a relatively small delay is introduced, such as of 0.5 seconds or less. This delay will barely be noticeable by participants to a video communication service 110 using the output video stream 230. In other embodiments, such as when the output video stream 230 will not be used in an interactive context but is instead published in a one-way communication to an external consumer 150, a larger delay may be introduced.

This deliberately introduced delay may be enough so as to achieve sufficient time for the synchronisation function 133 to map the collected individual primary stream 210, 301 video frames onto the correct common time reference 260 timestamp 261. It may also be enough so as to allow sufficient time to perform the event detection described above, in order to detect lost primary stream 210, 301 signals, slide changes, resolution changes, and so forth. Furthermore, deliberately introducing said delay may be enough so as to allow for an improved pattern detection function 134, as will be described in the following.

It is realized that the introduction of said delay may involve buffering 250 each of the collected and time-synchronised primary video streams 210, 301 before publishing the output video stream 230 using the buffered frames 213 in question. In other words, video and/or audio data of at least one, several or even all of the primary video streams 210, 301 may then be present in the central server 130 in a buffered manner, much like a cache but not (like a conventional cache buffer) used with the intention of being able to handle varying bandwidth situations but for the above reasons, and in particular to be used by the pattern detection function 134.

Hence, in some embodiments said pattern detection step comprises taking into consideration certain information of at least one, such as several, such as at least four, or even all, of the primary digital video streams 210, 301, the certain information being present in a later frame 213 than a frame of a time-synchronised primary digital video stream 210 yet to be used in the production of the output digital video stream 230. Hence, a newly added frame 213 will exist in the buffer 250 in question during a particular latency time before forming part of (or basis for) the output video stream 230. During this time period, the information in the frame 213 in question will constitute information in the "future" in relation to a currently used frame to produce a current frame of the output video stream 230. Once the output video stream 230 timeline reaches the frame in question 213, it will be used for the production of the corresponding frame of the output video stream 230, and may thereafter be discarded.

In other words, the pattern detection function 134 has at its disposal a set of video/audio frames 213 that have still not been used to produce the output video stream 230, and may use this data to detect said patterns.

The pattern detection can be performed in different ways. In some embodiments, performed by the AI component 134a, the pattern detection step comprises a second trained neural network or other machine learning component analysing at least two, such as at least three, such as at least four, or even all, of said primary digital video streams 120, 301 in concert to automatically detect said pattern 212.

In some embodiments, the detected pattern 212 comprises a speaking pattern involving at least two, such as at least three, such as at least four, different speaking participants 122, each associated with a respective participant client 121, to the shared video communication service 110, each of said speaking participants 122 being viewed visually in a respective one of said primary digital video streams 210, 301.

The production step preferably comprises determining, keeping track of and updating a current production state of the output video stream 230. For instance, such a state can dictate what, if any, participants 122 are visible in the output video stream 230, and where on the screen; if any external video stream 300 is visible in the output video stream 230, and where on the screen; if any slides or shared screens are shown in full-screen mode or in combination with any live video streams; and so on. Hence, the production function 135 can be viewed as a state machine with respect to the produced output video stream 230.

To generate the output video stream 230 as a combined video experience to be viewed by, for instance, an end consumer 150, it is advantageous for the central server 130 to be able to understand what happens on a deeper level than merely detecting individual events associated with individual primary video streams 210, 301.

In a first example, a presenting participant client 121 is changing a currently viewed slide. This slide change is detected by the event detection function 132 as described above, and metadata 242 is added to the frame in question indicative of a slide change having happened. This happens a number of times, since the presenting participating client 121 turns out to skip a number of slides forward in rapid succession, resulting in a series of "slide change" events detected by the even detection function 132 and stored with corresponding metadata 242 in the individual buffer 250 for the primary video stream 210 in question. In practice, each such rapidly forward skipped slide may be visible for only a fraction of a second.

The pattern detection function 134, looking at the information in the buffer 250 in question, spanning across several of these detected slide changes, will detect a pattern corresponding to one single slide change (that is, to the last slide in the forward-skipping, the slide remaining visible once the rapid skipping is finished), rather than a number or rapidly performed slide changes. In other words, the pattern detection function 134 will note that there are, for instance, ten slide changes in a very short period of time, why they will be handled as a detected pattern signifying one single slide change. As a result, the production function 135, having access to the patterns detected by the pattern detection function 134, may choose to show the final slide in full-screen mode in the output video stream 230 for a couple of seconds, since it determines this slide to be potentially important in said state machine. It may also choose not to show the intermediately viewed slides at all in the output stream 230.

The detection of the pattern with several rapidly changing slides may be detected by a simple rule-based algorithm, but may alternatively be detected using a trained neural network designed and trained to detect such patterns in moving images by classification.

In a different example, that may for instance be useful in case the video communication is a talk show, panel debate or similar, it may be desirable to quickly switch visual attention between, one the one hand, a current speaker, while, on the other hand, still giving the consumer 150 a relevant viewing experience by producing and publishing a calm and smooth output video stream 230. In this case, the event detection function 132 can continuously analyse each primary video stream 210, 301 to at all times determine whether or not a person being viewed in that particular primary video stream 210, 301 is currently speaking or not. This may, for instance, be performed as described above, using per se conventional image processing tools. Then, the pattern detection function 134 may be operable to detect particular overall patterns, involving several of said primary video streams 210, 301, said patterns being useful for producing a smooth output video stream 230. For instance, the pattern detection function 134 may detect a pattern of very frequent switches between a current speaker and/or patterns involving several concurrent speakers.

Then, the production function 135 can take such detected patterns into consideration when taking automated decisions in relation to said production state, for instance by not automatically switching visual focus to a speaker who only speaks for half a second before again going silent, or to switch to a state where several speakers are displayed side by side during a certain time period when both are speaking interchangeably or concurrently. This state decision process may in itself be performed using time series pattern recognition techniques, or using a trained neural network, but can also be based at least partly on a predetermined set of rules.

In some embodiments, there may be multiple patterns detected in parallel and forming input to the production function 135 state machine. Such multiple patterns may be used by different AI components, computer vision detecting algorithms, and so forth, by the production function 135. As an example, permanent slide changes can be detected while concurrently detecting unstable connections of some participant clients 121, while other patterns detect a current main speaking participant 122. Using all such available pattern data, a classifier neural network can be trained, and/or a set of rules can be developed, for analysis of a time series of such pattern data. Such a classification may be at least partly, such as completely, supervised to result in determined desired state changes to be used in said production. For instance, different such predetermined classifiers can be produced, specifically arranged to automatically produce the output video stream 230 according to various and different production styles and desires. Training may be based on known production state change sequences as desired outputs and known pattern time series data as training data. In some embodiments, a Bayesian model can be used to produce such classifiers. In a concrete example, information can be a priori gleaned from an experienced producer, providing input such as "in a talkshow I never switch from speaker A to Speaker B directly but always first show an overview before I focus on the other speaker, unless that the other speaker is very dominant and speaking loud." This production logic then be represented as a Bayesian model on the general form "if X is true|given the fact that Y is true|perform Z". The actual detection (of whether someone is speaking loudly, etc.) could be performed using a classifier or threshold-based rules.

With large data sets (of pattern time series data), one can use deep learning methods to develop correct and appealing production formats for use in automated productions of video streams.

In summary, using a combination of the event detection based on individual primary video streams 210, 301; the deliberately introduced delay; the pattern detection based on several time-synchronised primary video streams 210, 301 and the detected events; and the production process based on the detected patterns, makes it possible to achieve automated production of the output digital video stream 230 according to a wide possible selection of tastes and styles. This result is valid across a wide range of possible neural network and/or rule-based analysis techniques used by the event detection function 132, pattern detection function 134 and production function 135. In particular, it is valid in the below-described embodiments featuring a first produced video stream being used in the automatic production of a second produced video stream; and use of different deliberately added delays for different groups of participant clients.

As exemplified above, the production step may comprise producing the output digital video stream 230 based on a set of predetermined and/or dynamically variable parameters regarding visibility of individual ones of said primary digital video streams 210, 301 in said output digital video stream 230; visual and/or audial video content arrangement; used visual or audio effects; and/or modes of output of the output digital video stream 230. Such parameters may be automatically determined by said production function 135 state machine and/or be set by an operator controlling the production (making it semi-automatic) and/or be predetermined based on certain a priori configuration desires (such as a shortest time between output video stream 230 layout changes or state changes of the above-exemplified types).

In practical examples, the state machine may support a set of predetermined standard layouts that may be applied to the output video stream 230, such as a full-screen presenter view (showing a current speaking participant 122 in full-screen); a slide view (showing a currently shared presentation slide in full-screen); "butterfly view", showing both a currently speaking participant 122 together with a currently shared presentation slide, in a side-by-side view; a multi-speaker view, showing all or a selected subset of participants 122 side-by-side or in a matrix layout; and so forth. Various available production formats can be defined by a set of state machine state changing rules (as exemplified above) together with an available set of states (such as said set of standard layouts). For instance, one such production format may be "panel discussion", another "presentation", and so forth. By selecting a particular production format via a GUI or other interface to the central server 130, an operator of the system 100 may quickly select one of a set of predefined such production formats, and then allow the central server 130 to, completely automatically, produce the output video stream 230 according to the production format in question, based on available information as described above.

Furthermore, during the production a respective in-memory buffer is created and maintained, as described above, for each meeting participant client 121 or external video source 300. These buffers can easily be removed, added, and changed on the fly. The central server 130 can then be arranged to receive information, during the production of the output video stream 230, regarding added/dropped-off participant clients 121 and participants 122 scheduled for delivering speeches; planned or unexpected pauses/resumes of presentations; desired changes to the currently used production format, and so forth. Such information may, for instance, be fed to the central server 130 via an operator GUI or interface, as described above.

As exemplified above, in some embodiments at least one of the primary digital video streams 210, 301 is provided to the digital video communication service 110, and the publishing step may then comprise providing said output digital video stream 230 to that same communication service 110. For instance, the output video stream 230 may be provided to a participant client 121 of the video communication service 110, or be provided, via API 112 as an external video stream to the video communication service 110. This way, the output video stream 230 may be made available to several or all of the participants to the video communication event currently being achieved by the video communication service 110.

As also discussed above, in addition or alternatively the output video stream 230 may be provided to one or several external consumers 150.

In general, the production step may be performed by the central server 130, providing said output digital video stream 230 to one or several concurrent consumers as a live video stream via the API 137.

Figure 8A:
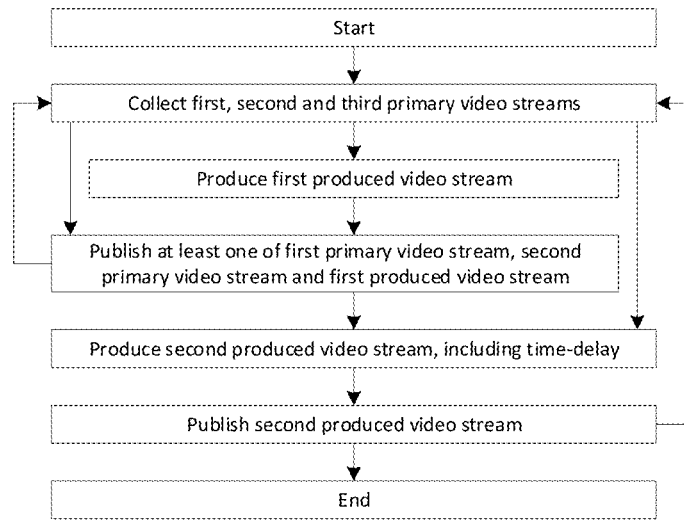
Figure 9:
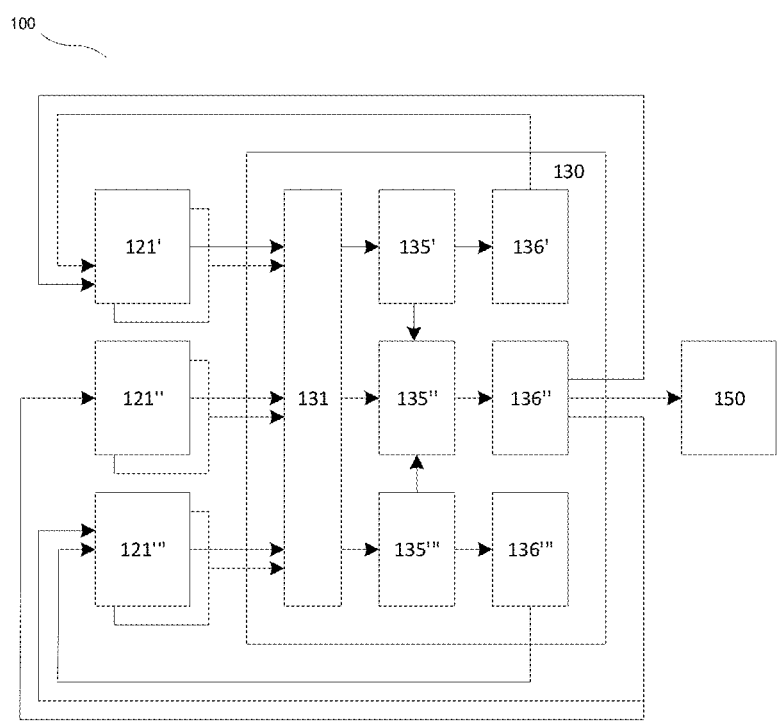

FIG. 8a illustrates a method according to a first aspect of the present invention, that will be described in the following with reference to what has been described above. Namely, in the method illustrated in FIG. 8a, which is for providing a digital video stream (in the following denoted the "second" digital video stream), all the mechanisms and principles described above regarding digital video stream collecting, event detection, synchronising, pattern detection, production and publishing may be applied.

Figure 8B:
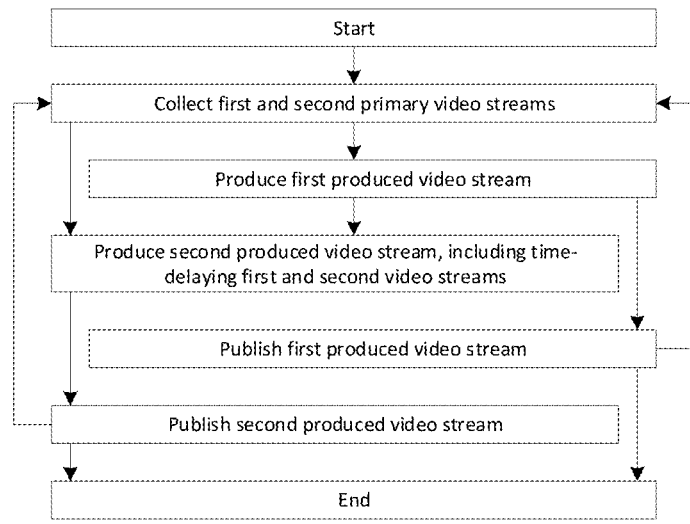
Figure 8C:
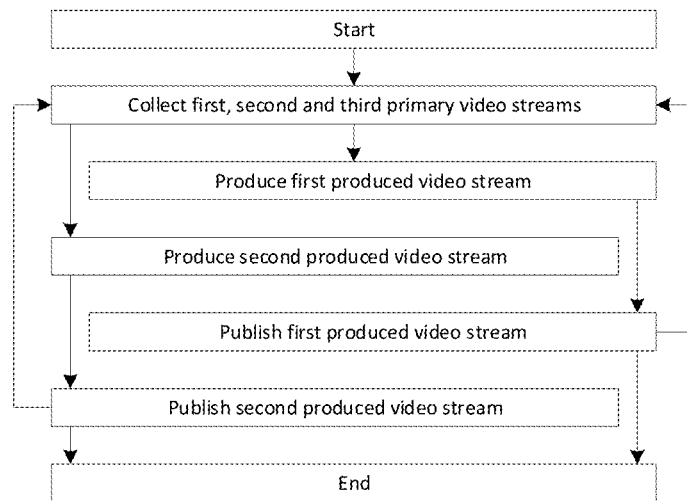
Figure 8D:
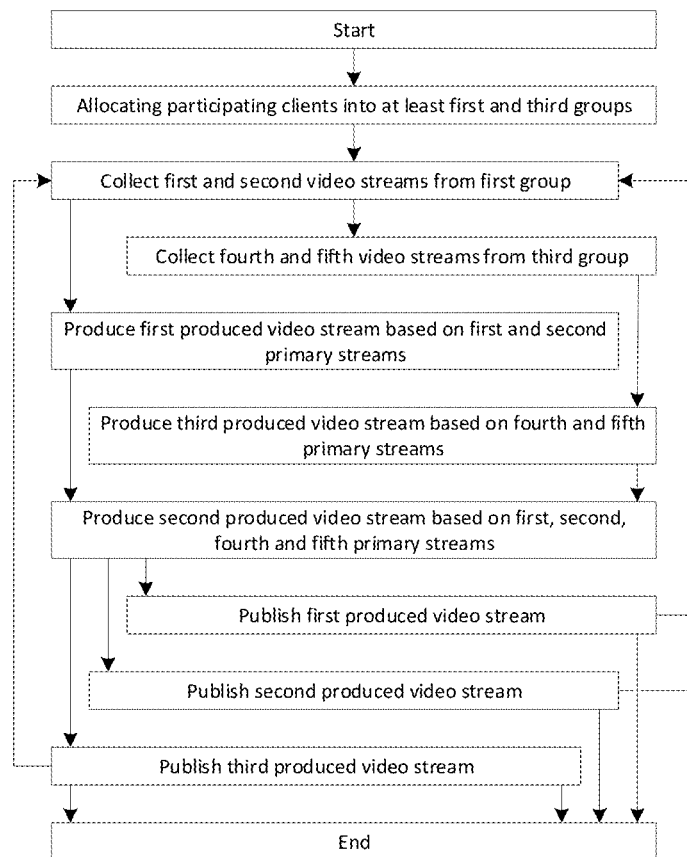

The corresponding can generally be said about FIG. 8b, illustrating a method according to a second aspect of the present invention, about FIG. 8c, illustrating a method according to a third aspect of the invention, and FIG. 8d, illustrating a method according to a fourth aspect of the invention.

Said first, second, third and fourth aspects can be combined freely. In particular, the method according to the fourth aspect can be used in combination with the method according to any one of the first, second and third aspects.

Moreover, FIG. 9 is a simplified view of the system 100 in a configuration to perform the methods illustrated in FIGS. 8a-8d.

The central server 130 comprises the collecting function 131, that may be as described above.

The central server 130 also comprises a first production function 135', a second production function 135" and a third production function 135'". Each such production function 135', 135", 135'" corresponds to the production function 135, and what has been said above in relation to production function 135 applies equally to production functions 135', 135" and 135'". The production functions 135', 135", 135" may be distinct or co-arranged in one single logical function with several functions, and there may also be more than three production functions, depending on the detailed configuration of the central server 130. The production functions 135', 135", 135'" may in some cases be different functional aspects of one and the same production function 135, as the case may be. The various communications between the production functions 135', 135", 135'" and other entities may take place via suitable APIs.

It is further realised that there may be a separate collecting function 131 for each of the production functions 135', 135", 135'" or groups of such production functions, and that there may be several logically separated central servers 130, each with a respective collecting function 131, depending on the detailed configuration.

Moreover, the central server 130 comprises a first publishing function 136', a second publishing function 136" and a third publishing function 136'". Each such publishing function 136', 136", 136'" corresponds to the publishing function 136, and what has been said above in relation to publishing function 136 applies equally to publishing functions 136', 136" and 136'". The publishing functions 136', 136", 136'" may be distinct or co-arranged in one single logical function with several functions, and there may also be more than three publishing functions, depending on the detailed configuration of the central server 130. The publishing functions 136', 136", 136'" may in some cases be different functional aspects of one and the same publication function 136, as the case may be.

In FIG. 9, three sets or groups of participating clients are shown, to illustrate the principles described herein, each corresponding to the above-described participating client 121. Hence, there is a first group of such participating clients 121'; a second group of such participating clients 121"; and a third group of such participating clients 121'". Each of these groups may comprise one or, preferably, at least two, participating clients. There may be only two such groups, or more than three such groups, depending on the detailed configuration. The allocation between groups 121', 121", 121'" may be exclusive in the sense that each participant client 121 is allocated to maximum one such group 121', 121", 121'". In alternative configurations, at least one participant client 121 may be allocated to more than one such group 121', 121", 121'" at the same time.

FIG. 9 also shows an external consumer 150, and it is realised that there may be more than one such external consumer 150 as described above.

FIG. 9 does not, for reasons of simplicity, show the video communication service 110, but it is realised that a video communication service of the above-discussed general type may be used with the central server 130, such as providing a shared video communication service to each participating client 121 using the central server 130 in the way discussed above.

Turning back to FIG. 8a, in a first step the method starts.

In a subsequent collecting step, a number of said primary video streams, in this exemplifying case at least a first primary digital video stream, a second primary digital video stream and a third primary digital video stream, each collected from respective participating client 121 are collected. Hence, a first primary digital video stream is collected from a first participant client; a second primary digital video stream is collected from a second participant client; and a third primary digital video stream is collected from a third participant client.

In a subsequent publishing step, at least one video stream is provided to at least one of said first participant client and said second participating client. Namely, the video stream is at least one of said first primary digital video stream, said second primary digital video and a first produced video stream having been produced based on at least one of said first and second primary video streams. The production of such a primary video stream may be as described below, performed by the first production function 135', and may for instance involve introducing a latency of the first produced digital video stream as a result of the production in question.

The provision and publishing in question may be continuous, and may be in real-time.

For instance, the first and second participants may take part in the same video communication service, such as a video conference, as is also described elsewhere herein. Then, for instance the first participating client 121 may be provided with the second digital video stream for viewing on a screen 124 of the first participating client 121, and vice versa, so that the first and second participating client 121 users 122 can see and interact with each other. In addition, or instead, each or one of the first and second participating clients may be provided with said first produced digital video stream for viewing on a respective screen 124 of the participating client 121 in question. In case both the first produced digital video stream and any one of the first and second primary video stream is provided in tandem, the primary video stream in question may be delayed, as described below, so as to time-synchronise the video streams being displayed at the participating client 121 in question.

In a subsequent second production step, performed by the second production function 135", the second produced video stream is produced as a digital video stream based on said first primary digital video stream, said second primary digital video stream and also based on said third primary digital video stream. It is noted that the third primary digital video stream is preferably not provided, neither as it is or as a part of a produced digital video stream, to the first or second participating client. As is described elsewhere herein, the first and second participant clients may be allocated to a different group of participant clients as compare to the third participating client.

The second production step comprises the introduction of a time-delay, so that the second produced video stream is time-unsynchronised with any of the video streams that may be provided to said first or second participant clients in said publishing step. This time-delay may be deliberately added and/or be a direct consequence of the production of the second produced digital video stream, in any of the ways described herein. Preferably, the second produced digital video stream is available for publication at a delay in relation to any video stream published at the first and/or second participating client. One way of thinking about this is that any consuming client of the second produced digital video stream consumes this second produced digital video stream in a "time zone" which is slightly after (time-wise) a video stream consumption "time zone" of the first and second participating clients.

For instance, in case one or several primary digital video streams are provided to the first and/or second participating client, such provision may be direct (without the use of any deliberately introduced time-delay) and/or involve only computationally relatively lightweight processing before provision to the participating client in question; whereas the production of the second produced digital video stream may involve a deliberately introduced time-delay and/or relatively heavyweight processing leading to the second produced digital video stream being produced for earliest publication at a delay in relation to an earliest delay for publication of the first and/or second primary digital video streams. In case the first produced video stream is provided to the first and/or second participating client, the first produced digital video stream is produced using a relatively short deliberately added time-delay and/or relatively lightweight processing, whereas the second produced digital video stream is produced using a relatively long deliberately added time-delay and/or relatively heavyweight processing, resulting in that the second produced digital video stream is correspondingly produced for earliest publication at a delay in relation to an earliest delay of the first produced digital video stream.

Normally, the second produced digital video stream is not provided for publication at the first or second participating client, but instead at a participating client allocated to a different group (such as the first group 121') than a group that the first and second clients belong to, such as the third participating client (allocated to a different group such as the second group 121") and/or an external consuming client 151.

Hence, as illustrated in FIG. 8a, said publishing step further comprises continuously providing the second produced video stream to at least one consuming client 121, 150 that is not the first or second participating client.

As is also illustrated in FIG. 8a, the method may iterate, continuously producing and providing/publishing the digital video streams in question.

In a subsequent step, the method ends.

FIG. 8b illustrates a method according to said second aspect.

In a first step, the method starts.

In a subsequent collecting step, a number of said primary video streams, in this exemplifying case at least the first primary digital video stream and the second primary digital video stream collected from respective participating clients 121' selected from said first group of participating clients, are collected.

As is the case for the method illustrated in FIG. 8a, the collecting may be as described above, the collecting function 131 for instance handling raw data without performing any reencoding. There may also be an event detection step, a synchronising step and a pattern detection step of the above-described general types, applied to the primary digital video streams collected from the first group of participating clients 121' with the purpose of producing the first produced digital video stream.

Namely, in a subsequent first production step, the first production function 135' receives said first and second primary video stream as a respective digital video stream from the collection function 131, and produces said first produced digital video stream based on said first and second primary digital video streams. Preferably, the first digital video stream is not produced based on any other participant client 121, apart from the participant clients allocated to said first group 121', connected to one and the same video communication service 110 in a way allowing such other participant clients 121 to interact in said video communication service 110 with first group 121' members. On the other hand, the first produced video stream may be produced based on other information, such as an external video feed; static data or graphics. To be clear, these and other things described in relation to FIG. 8b may also apply to the methods illustrated in FIGS. 8a, 8c and 8d.

The result of this first production is hence a produced digital video stream of the above-described type, that may for instance visually comprise one or several of the primary video streams in question, in processed or non-processed form, as sub-parts. This first produced video stream may comprise live-captured video streams, slides, externally provided video or imagery, and so forth, as generally described above in relation to video output streams produced by the central server 130. The first produced video stream may also be produced based on detected events and/or patterns of deliberately delayed or real-time first and/or second primary video streams, provided by first group 121' participant clients, in the general way described above.

In a subsequent second production step, the second produced digital video stream is then produced as a digital video stream based on both said first produced video stream and also based on said first and second primary digital video streams collected from the first group of participant clients 121'. The first and second primary digital video streams may be provided to the second production function 135" from the collecting function 131; whereas the first produced video stream may be provided from the first production function 135' to the second production function 135". In case the first and second production functions 135', 135" are one and the same logical unit (which may be the case), the production simply takes place in two consecutive steps in that production function.

In a subsequent step, the method ends.

It is realised that said first and/or second primary video streams fed to the second production step 135" may be preformatted in various ways prior to the second production step 135". They may also be deliberately delayed in order to detect events and/or patterns as generally described above.

The second production step may be similar to any of the production steps described above, and all that has been said above with respect to the functioning of the production functions 135, 135' is also correspondingly applicable to the second production function 135". For instance, the second production function 135" may produce the second produced video stream by formatting the primary video streams in various ways as a part of the production process.

As mentioned, the first and second primary video streams may be time-synchronised to each other, such as using a common time reference in any of the ways discussed above, before being fed to the first production function 135'.

However, in said second production step, the first and second primary digital video streams may be deliberately time-delayed (for instance, deliberately time-delayed in addition to any already-applied time delay performed for time-synchronising the primary video streams to each other and/or to be able to detect events and/or patterns for use in the first production function 135'). The purpose and result of this now deliberately introduced time delay is to time-synchronise them with the first produced video stream before used in the second produced video stream. Hence, the additional delay introduced with respect to the first and second primary video streams is then equal to, substantially equal to or at least determined as a function of the latency associated with performing the first production step. The exact latency to add may be determined, for instance, based on a detected common time reference of the general type described above.

Namely, the first production step, in which the first produced video is produced, is normally associated with a certain latency (due to data processing of the first production step 135' itself), that may depend on for instance an available computer power and a first production step 135' complexity. This latency is typically not present (or any latency is at any rate smaller) for said first and second video streams themselves, that are simply captured, optionally processed in the mentioned ways and thereafter provided by the collecting function 131 to and for use by the second production function 135".

By deliberately introducing this (additional) delay to said first and second primary video streams, taking into consideration a latency of the first produced video stream resulting from the first production step, so as to time-synchronising these three video streams, it is possible to produce the second video stream without any synchronising problems even in the case in which the second produced video stream is produced based not only on the first and second primary video streams but also based on the first produced video stream in turn being produced based on the same first and second primary video stream. Namely, the second produced video stream is then produced based on the time-delayed first and second primary digital video streams.

Hence, the first produced video stream may be fed into the second production step 135", the second produced video stream hence being produced using two (or more) production steps 135', 135" where the same primary video streams are used in at least two such production steps associated with different latencies in relation to a common time reference of the primary video streams provided by the collecting function 131.

In an illustrative example, the first group 121' participant clients are part of a debate panel, communicating using the video communication service 110 at a relative low latency, each one of these participant clients continuously being fed the first produced video stream (or the respective primary video stream of each other, as described in connection to FIG. 8a, above). An audience to the debate panel is constituted by the second group 121" participant clients, continuously being fed the second produced video stream in turn being associated with a slightly higher latency. The second produced video stream may be automatically produced, in the general manner discussed above, to automatically shift between views of individual debate panel speakers (participant clients allocated to the first group 121', such views being provided directly from the collection function 131) and a produced view showing all debate panel speakers (this view being the first produced video stream). Using the invention according to the first and/or second aspects, the audience can receive a well-produced experience while the panel speakers may interact with each other at minimum latency.

The delay deliberately added to the first and second primary video streams in connection to the second production step may be at least 0.1 s, such as at least 0.2 s, such as least 0.5 s; and may be at the most 5 s, such as at the most 2 s, such as at the most 1 s. It may also depend on an inherit latency associated with each primary video stream, so as to achieve a full time-synchronisation between the first and second primary video streams and also the first produced video stream.

It is understood that the first and second primary video streams, as well as the first produced video stream, may all be additionally deliberately delayed so as to improve pattern detection for use in the second production function 135" in the general way described above.

FIG. 9 illustrates a number of alternative or concurrent ways of publishing the various produced video streams produced by the central server 130.

Generally, in a subsequent publishing step, performed by a first publishing function 136' arranged to receive the first produced video stream from the first production function 135', said first produced video stream may be continuously provided to at least one of a first participating client 121 and a second participating client 121. For instance, this first participating client may be the participating client from the group 121' providing the first primary digital video stream, and/or the second participating client may be the participating client from the group 121' providing the second primary digital video stream.

In other words, the first produced video stream may be continuously provided to at least one of said first participating client and said second participating client.

In some embodiments, one or several of the participating clients of the group 121' may also receive the second produced video stream, by the second publishing function 136", in turn being arranged to receive the second produced video stream from the second production function 135".

Hence, each of the primary video stream-providing participating clients being allocated to the first group 121', if not provided directly with said primary digital video streams, may be provided with the first produced video stream, involving a certain delay or latency due to the synchronisation between said primary video streams and also a possibly deliberately added delay or latency added in order to allow sufficient time for an event and/or pattern detection, as described above.

Correspondingly, each of the participating clients being allocated to the second group 121" may be provided with the second produced video stream, also including said deliberately added delay in connection to the second production step, added with the purpose of time-synchronising the first produced video stream with said first and second primary video streams. This extra delay may or may not cause communication difficulties between the participating clients of the second group 121", for instance since they interact in a different manner than the first group 121' participants with the video communication service 110 (see below). In other embodiments (such as when the first group 121' participating clients are provided directly with the primary digital video streams), each of the participating clients allocated to the second group 121" may be provided directly with the first produced video stream.

Hence, first group 121' participant clients form a subgroup of all participating clients 121 currently participating in the video communication service 110 in question, being present in and using the service in question in a "time zone" that is slightly ahead (such as 1-3 seconds ahead) of any participating client instead being continuously provided a produced video stream, such as the first or the second produced video stream. Still, other participating clients (not allocated to the first group 121' but instead to the second group 121") will be continuously provided the second produced video stream, which is produced based on (and may at each point in time contain either or both of) the first and second primary video streams, but then in a slightly later "time zone". Since the first produced video stream is produced directly based on the first and second primary video streams, without any delay or latency added to time-synchronise them to an already-produced video stream based on the primary video streams themselves, a more direct, low-latency video communication service 110 experience is then made available to these participating clients 121.

Again, this may also mean that the participating clients 121 allocated to the first group 121' are not provided access to the second produced video stream.

Namely, said first and second primary digital video streams may be provided as a part of a shared digital video communication service 110 of the above-discussed general type, and said first participating client and said second participating client (belonging to the same first group 121') may both be respective remotely connected participant clients to said shared digital video communication service 110. Said second group 121" participating clients (and also the third group 121''' participating clients) may also be remotely connected participant clients to said shared digital video communication service 1110.

It is realised that, in this context, "remotely connected" does not necessarily imply that such participant clients 121 or corresponding users 122 are located in different rooms, premises or geographic locations, but that users 122 audio/visually interact with the video communication service 110 using the participating client 121 in question.

Said collecting step may comprise collecting said first and/or second primary digital video streams from the shared digital video communication service 110, such as in any of the ways discussed above.

FIG. 8c illustrates a method according to said third aspect. As mentioned, the method shown in FIG. 8c, as is also the case for the method shown in FIG. 8d, is similar to the one illustrated in FIGS. 8a and 8b, and these four aspects of the invention are freely combinable. All that is said in relation to one of these aspects is readily applicable, in the corresponding manner, to the other aspects, pending compatibility.

In a first step, the method starts.

In a subsequent collecting step, from said first participant client, allocated to said first group 121', the first primary digital video stream is collected, and the second primary digital video stream is collected from the second participant client, also being allocated to the same first group 121'. Moreover, a third digital video stream is collected from a third participant client, which may be not allocated to the first group 121'. For instance, the third participant client may be allocated to the second group 121". This collecting step may be similar to the collecting step described in relation to FIG. 8b.

In a subsequent first production step, which may be similar to the first production step described in relation to FIG. 8b, the first produced video stream may be produced as a digital video stream based on said collected first and second primary digital video streams. It is noted here that it may be so that the first produced video stream is not produced based on said third primary video stream.

The first produced digital video stream is continuously produced for publication, to some consuming client, with a first latency. In other words, according to this third aspect the first produced digital video stream is produced so that, if each newly produced frame of the first produced digital video stream is published immediately upon production of that frame in question, the publication of that frame takes place at the first latency.

In a subsequent second production step, which may be similar to the second production step described in relation to FIG. 8b, the second produced video stream is produced as a digital video stream based on all three primary digital streams, in other words all of said first, second and third primary digital video streams.

In a way corresponding to the first produced video stream and the first latency, the second produced digital video stream is continuously produced for publication with a second latency. The second latency being larger than the first latency. This means that, if the first and second produced video streams both contain frames from, for instance, the first primary video stream, such frames will be shown earlier in an immediate publication of the first produced video stream as compared to in an immediate publication of the second produced video stream.

In a subsequent publishing step, which may be similar to the publishing step described in relation to FIG. 8b, at least one of said first primary digital video stream, said second primary digital video stream and said first produced video stream (such as any set of one or more of these streams) is continuously provided to at least one of the first participating client and the second participating client. This is similar to the method described in relation to FIG. 8a, above.

Also, said second produced video stream is continuously provided to at least one other participating client.

In a subsequent step, the method ends.

The same example used to illustrate a practical application of the second-aspect solution can also be used to illustrate how this third aspect can be put into practise. Since the third primary video stream is collected from a second group 121" participant client, having lower requirements on latency than the first-group 121' participating clients providing the first and second primary video streams, the second produced video stream will be provided in a way with more latency, making it possible to achieve a desired automatic production, whereas the first group 121' panel debate speakers can interact among themselves with lower latency.

Naturally, there may be more second group 121"-provided primary video streams, in addition to the third primary video stream, that will then be used correspondingly.

In the publishing step described in relation to FIGS. 8b and 8c, the second produced video stream may be continuously be provided to at least one consuming client that is not the first or second participating client. More generally, is may be continuously provided to a participating client 121 that is not allocated to the first group 121' and/or to an external consumer 150.

As mentioned above, the collecting step 131 may comprise collecting at least one of said primary digital video streams, such as an additional primary video stream in addition to the first and second primary video streams, as an external digital video stream 301 of the above-discussed type, collected from an information source 300 being external to said shared digital video communication service 110. As also described above, such an external video stream 301 may be time-synchronised to the first and second primary video streams by a synchronising function 133 logically situated (in terms of data flow) between the collecting function 131 and the first production function 135'. The corresponding applies to the third, fourth and fifth primary video stream described herein. The first and/or second produced video stream may then be produced based on said external digital video stream 301.

As is also generally discussed above, the first 135' and/or second 135" production step may further comprise producing the respective produced (first and/or second) video stream in question based on a set of predetermined and/or dynamically variable parameters regarding visibility of individual ones of said first and/or second primary digital video streams 210 in said produced digital video stream in question; visual and/or audial video content arrangement; used visual or audio effects; and/or modes of output of the produced digital video stream in question.

As also discussed, the first 135' and/or second 135" production step may be performed by the central server 130, providing said second produced video stream to one or several concurrent (external and/or participating) consumer clients as a live video stream via an API 137 of the above-discussed general type.

Hence, the different groups 121', 121", 121''' of participant clients 121 may have different requirements in terms of latency tolerance. This may in particular be true in case they participate in one and the same live video communication service 110 as participating clients 121 to such service 110. This will be further exemplified below.

FIG. 8d illustrates a method according to said fourth aspect of the invention.

In a first step, the method starts.

Generally, and as is illustrated in FIG. 8d, a method for producing said second produced digital video stream may comprise a subsequent allocation step, that may be an initial step but that may also be performed at any time during the method, for instance as a reallocation step.

In this allocation step, a plurality of participating clients 121 may be allocated across at least two groups 121', 121", 121''' of such participating clients 121. In the present example, the allocation is into at least the first 121' and third 121" groups, but participant clients 121 may, of course, also be allocated into the third group 121'''.

More particularly, the first primary digital video stream and the second primary digital video stream may be collected, such as by the collection function 131 and in a subsequent collecting step, from respective participant clients 121 allocated to said first group 121' of participant clients. However, a fourth primary digital video stream and a fifth primary digital video stream may also be collected, such as by the collecting function 131 and in said collecting step, but from respective participant clients 121 allocated to the third group 121" " of participant clients.

In the example illustrated in FIG. 9, the participant clients 121 allocated to the third group 121" may have less strict latency requirements than the participant clients 121 allocated to the first group 121'. For instance, the first group 121' participating clients 121 may be the members of the above-discussed debate panel (interacting with each other in real-time hence requiring low latency), whereas the third group 121" participating clients 121 may constitute a panel of experts or similar, that interact with the panel but in a more structured way (such as using clear questions/answers), thus being able to tolerate higher latency than the first group 121'.

The first produced video stream may be produced as described above, by the first production function 135' and based on the first and second primary video streams (and any additional input content, as discussed). A third produced video stream is also produced, in a corresponding manner, but by a third production function 135"" and based on (at least) the fourth and fifth primary video stream.

Both the first produced video stream and the third produced video stream may be fed to the second production function 135" to base the production of the second produced video stream on, as the case may be.

Then, however, according to this fourth aspect, in the second production step, being performed by the second production function 135", the second produced video stream is produced based on at least one of said first and second primary video streams, and further based on at least one of said fourth and fifth primary video streams, such as in the way described above. The second production function 135" may be provided with the fourth and fifth primary video streams from the collecting function 131 in the corresponding manner as the first and second primary video streams, including any cross-stream time-synchronisation, event detection, and so forth. It is particularly noted that the second produced video stream may be directly or indirectly based on the first and/or second primary video stream, for instance by the second produced video stream being based on the first produced video stream, in turn being based on the first and second primary video streams; and correspondingly for the fourth and fifth primary video streams and the third produced video stream.

Said third produced video stream is produced in a subsequent third production step.

According to the fourth aspect, the third production step comprises deliberately introducing a time-delay with respect to said fourth and fifth primary video streams so as to be time-synchronised to each other but time-unsynchronised (not time-synchronised) to the first produced video stream. It is understood that this time-delay may be introduced in the third production function 135" itself, or in a corresponding synchronising function 133 upstream of the third production function 135'" in question.

Hence, the first production step 135' may involve introducing a deliberate delay or latency of the type discussed above, introduced in addition to any delay introduced as a part of the synchronisation of the first and second primary video streams, and introduced so as to achieve sufficient time, for instance, to perform an efficient event and/or pattern detection. Such introduction of a deliberate delay or latency may take place as a part of a synchronising performed by said synchronising function 133 (not shown in FIG. 9 for reasons of simplicity). The corresponding may be true for the third production step 135"", but introducing a deliberate delay or latency that is different from the deliberately introduced delay or latency for the first production step 135'.

In particular, the deliberately introduced delays or latencies result in a time-unsynchronisation between the first produced video stream and the third produced video stream. This means that the first and third produced video streams do not follow a common timeline in case they are both immediately and continuously published upon production of each individual frame.

As has been discussed above, the second produced video stream may be associated with higher latency than the first produced video stream, and possibly also higher latency than the third produced video stream. Hence, the second production function 135" may be arranged to synchronize the first, second, fourth and fifth primary video streams by adding additional respective delays thereto before incorporating them into the second produced video stream.

In a publishing step, the third produced video stream is continuously provided to at least one participant client allocated to said third group 121'", where it may be continuously published to the user 122 in question. Similarly, the first produced video stream may be continuously provided to at least one participant client allocated to the first group 121', where it may be published to that user 122 in question; and/or the second produced video stream may be provided and published as described above.

In a subsequent step, the method ends.

Hence, in this fourth aspect three separate produced video streams may be produced and consumed/published simultaneously, but in different "time zones". Even though they are based on at least partly the same primary video material, the produced video streams are published with different latency. The first group 121', requiring the lowest latency, can interact using the first produced video stream, offering very low latency; the third group 121", willing to accept slightly larger latency, can interact using the second produced video stream, offering more latency but on the other hand greater flexibility in terms of deliberately added delays so as to achieve a better automatic production as described elsewhere herein; whereas the second group 121", that are not so sensitive to latency, can enjoy interaction using the second produced video stream that can both incorporate material from the first 121' and third 121'" groups and also be automatically produced in a very flexible manner. It is especially noted that all these groups 121', 121", 121'" of participant users interact with each other using said video communication service 110, despite using said varying latencies and hence acting in different "time zones". However, due to the synchronisation of the individual input video streams in each production function, the participant users 121 will not notice the differing latency from their respective perspective.

Said first production step 135' may comprise time-delaying the first and second primary video streams so as to time-synchronising them to each other, as described above.

Correspondingly, said third production step 135'" (or a corresponding synchronisation step 133) may comprise time-delaying said fourth and fifth primary video streams so as to time-synchronise them to each other, but using a larger maximum time-delay than a maximum time-delay used for time-delaying said first and second primary video streams in said first production step 135' (or corresponding synchronisation step 133), resulting in that the first produced video stream is not time-synchronised with the third produced video stream in the described way.

As discussed above, respective participating clients 121 allocated to each of said groups 121', 121", 121'" may participate in one and the same video communication service 110 within which the second produced video stream is continuously published.

Then, different ones of said groups 121', 121", 121'" may be associated with different participator interaction rights in said video communication service 110, and different ones of said groups 121', 121", 121'" may be associated with different maximum time-delays (latencies) used for producing a respective produced video stream published to participant clients 121 allocated to the group 121', 121", 121'" in question.

For instance, the first group 121' of panel debating participant clients may be associated with full interaction rights, and can speak whenever they wish to. The third group 121'" of participant clients may be associated with slightly restricted interaction rights, for instance that they need to request the floor before being able to speak by the video communication service 110 unmuting their mics. The second group 121" of audience participant users may be associated with even more restricted interaction rights, such as only being able to pose questions in writing in a common chat room but not being able to speak.

Hence, various groups of participant users may be associated with different interaction rights and different latencies for the respective produced video stream that is published to them, in a way so that latency is an increasing function of decreasing interaction rights. The freer the participant user 121 in question is allowed, by the video communication service 110, to interact with other users, the lower the accepted latency. The lower the accepted latency, the smaller the possibilities for the corresponding automatic production function to take into considerations things such as detected events or patterns.

A group having a largest latency may be a viewer-only group, with no interaction rights apart from passive participation in the video communication service.

In particular, a respective maximum time-delay (latency) for each of said groups 121', 121", 121'" may be determined as a largest latency difference across all primary video streams and any produced video streams that are continuously published to participating clients in the group in question. To this sum may be added any additional time-delay added deliberately with the purpose of detecting events and/or patterns as described above.

As used herein, the term "production" and "produced digital video stream" may refer to different types of production. In one example, a single, well-defined digital video stream is produced by a central entity, such as the central server 130, to form the produced digital video stream in question, for provision to and publication at each of a particular set of participating client 121 that are to consume the produced digital video stream in question. In other cases, different individual such participating clients 121 may view a slightly different version of the produced digital video stream in question. For instance, the produced digital video stream may comprise several individual or combined digital video streams that the participating client 121 local software function 125 can allow the user 122 in question to switch between; arrange on the screen 124; or to configure or process in any other way. Many times, what is important is in what "time zone" (i.e. at what latency) that the produced digital video stream, including any time-synchonised subcomponents, are provided. Hence, the case where the first and second participating clients are provided each other's primary video streams, described above in connection to FIG. 8a, may be viewed as a first produced digital video stream being provided to the first and second participant clients (in the sense that the time-synchronised set of raw or processed first and second primary digital video streams are made available to both the first and second participant clients).

To further clarify and exemplify the use of participant clients groups 121', 121", 121'" described above, the following example is provided, in the form of a video communication service meeting involving three different concurrent "time zones":

A first group of participant clients 121' are experiencing interaction with each other in real-time, or at least near real-time (depending on unavoidable hardware and software latencies). These participant clients are provided video, including sound, from each other to achieve such interaction and communication between the users 122 in question. The first group 121' may serve users 122 at the core of the meeting, the interaction of which may be of interest for other (non-first group 121') participant clients to take part of.

A second group of such other participant clients 121" participate in the same meeting, but in a different "time zone", being further from real-time than the first group participant clients 121'. For instance, the second group 121" may be an audience with interaction privileges such as the possibility to pose questions to the first group 121'. The "time zone" of the second group 121" may have a delay in relation to the "time zone" of the first group 121' such that posed questions and answers are associated with a noticeable but short delay. On the other hand, this slightly larger delay allows this second group 121" participant clients to experience a produced digital video stream that was automatically produced in a more complex manner, providing a more agreeable user experience.

A third group of such other participant clients 121'" also participate in the same meeting, but as viewers only. This third group 121'" consume a produced digital video stream that can be automatically produced in an even more elaborate and complex manner, being consumed in a third "time zone" having even more delay than the second "time zone". However, since the third group 121'" cannot provide input to the communication service in a way affecting the first 121' and second 121" groups, the third group 121'" will experience the meeting as being performed in "real-time", with an agreeable production.

There may, of course, be more than three such groups of participant clients, being associated with respective meeting "time zones" of increasingly larger time delay and increasing production complexity, using the principles described herein.

The present invention also relates to a computer software function for providing the second digital video stream according to what has been described above. Such a computer software function may then be arranged to, when executing, perform at least some of the above-described collecting, event detection, synchronising, pattern detection, production, and publishing steps described above, in particular with respect to the first, second, third and/or fourth aspects. The computer software function may be arranged to execute on physical or virtual hardware of the central server 130, as described above.

The present invention also relates to the system 100 as such, being a system for providing the second digital video stream, and in turn comprising the central server 130. The central server 103, in turn, may be arranged to perform at least some of said collecting, event detection, synchronising, pattern detection, production, and publishing steps described above, in particular with respect to the first, second, third and/or fourth aspects. For instance, these steps may be performed by the central server 130 executing said computer software function to perform said steps as described above.

It is understood that the principles of automatic production based on an available set of input video streams described above, such as involving time-synchronisation of such input video streams, event and/or pattern detection, and so forth, may be applied at different levels concurrently. Hence, one such automatically produced video stream may form an available input video stream to a downstream automatic production function in turn producing a video stream, and so on.

The central server 130 may be arranged to control group 121', 121", 121''' allocation to individual participant clients 121. For instance, changing group allocation for a particular such participant client dynamically during the course of the live video communication service session may be a part of the automatic production of said video communication service by the central server 130. Such reallocation may be triggered based on a predetermined time-table or dynamically, for instance as a function of parameter data that may change dynamically over time, for instance upon the request (provided via the client 121 in question) of individual participant client users 122.

Correspondingly, the central server 130 may be arranged to dynamically change the group structure during the course of the video communication service, such as only using a certain group for a predetermined time slot (such as during a planned panel debate).

One possible practical solution to group allocation is to use the concept of "breakout rooms" available on some video conference systems. Then, participant clients 121 allocated to a particular group 121', 121", 121''' may be allocated to such a breakout room, and the central server 130 may then obtain video stream data, such as individual primary video streams or a produced video stream, from that breakout room for use in downstream production steps in the central server 130. Such video stream extraction may in itself take place as has been described above.

In all of the above-described aspects, the present invention may further comprise an interaction step, in which at least one participant client of a first group, the first group being associated with a first latency, interacts in a two-way (bi-directional) manner with at least one participant client of a second group, the second being associated with a second latency, the second latency being different from the first latency. It is understood that these participating clients may all be participants to one and the same communication service of the above-described type.

In such a case, it is preferred that said participant clients, being associated with different latencies (or "time zones" as discussed above), are temporarily put in the same "time zone", in other words associated with the same latency. For instance, this may take place by one of said participant clients that is associated with a larger latency temporarily is temporarily provided with one or several primary/produced digital video streams having och being produced using a smaller latency than the latency associated with the participant client in question. In other words, if the participating client that normally is continuously provided with one or several video streams having a larger latency wants to interact with a participating client that is continuously provided with one or several video streams having a smaller latency, the former participating client is instead temporarily continuously provided with one or several of the latter video streams. Hence, the higher-latency participant client temporarily switches to lower-latency "time zone" that the lower-latency participant client is associated with. After the interaction, the higher-latency participant client is then switched back to the higher-latency communication environment used before the interaction.

For instance, a member of the above-discussed audience to a panel debate may want to pose a question. In this case, the audience member is given the word and is switched to the paneld debate "time zone". This means that the audience member will see the panel with lower latency, but in a less elaborate production. More particularly, the audience member may see one or several of the same video streams provided to the panel members during the interaction. The rest of the audience will remain in the higher-latency audience "time zone", and will therefore not notice any difference. After the interaction between the speaking audience member and the panel, the speaking audience member will again be provided with the higher-latency video stream or streams as before the interaction.

The switch between different "time zones" can be effected automatically by the central server 130.

Above, preferred embodiments have been described. However, it is apparent to the skilled person that many modifications can be made to the disclosed embodiments without departing from the basic idea of the invention.

For instance, many additional functions can be provided as a part of the system 100 described herein, and that are not described herein. In general, the presently described solutions provide a framework on top of which detailed functionality and features can be built, to cater for a wide variety of different concrete application wherein streams of video data is used for communication.

One example is a demonstration situation, wherein primary video streams include a view of the presenter, a shared digital slide-based presentation, and a live video of a product being demonstrated.

Another example is a teaching situation, wherein primary video streams include a view of a teacher, a live video of a physical entity being the topic of the teaching, and respective live video of several students that may pose questions and engage in dialogue with the teacher.

In either of these two examples, a video communication service (that may be or may not be part of the system) may provide one or several of the primary video streams, and/or several of the primary video streams may be provided as external video sources of the types discussed herein.

The various groups were exemplified as a debate panel, a panel of experts and an audience. However, it is realized that any division of participant user in a digital video communication service into two or more groups is possible, reflecting a current object and structure of the communication to be performed. For instance, one or more groups may include participant users accessing the video communication service remotely, from a different geographic location, whereas one or more other groups include participant users accessing the video communication service from a common central location such as a lecture hall. The same principles as described above apply to all such cases.

In general, all which has been said in relation to the present method is applicable to the present system and computer software product, and vice versa as applicable.

Hence, the invention is not limited to the described embodiments, but can be varied within the scope of the enclosed claims.

The invention claimed is:

1. A method for providing a second digital video stream, the method comprising:
   in a collecting step, a central server collecting from a first participant client a first primary digital video stream, from a second participant client a second primary digital video stream and from a third participant client a third primary digital video stream, the central server being accessible in a logically centralized manner, providing a video communication service and/or being comprised in a participant client;

in a first production step, the central server automatically producing a first produced digital video stream based on said first and second primary digital video streams, the first produced digital video stream being continuously produced for publication with a first latency;

in a second production step, the central server automatically producing the second digital video stream based on said first, second and third primary digital video streams, said second production step comprising automatically detecting events and/or patterns is said primary digital video streams and basing automatic production decisions on said events and/or patterns, the second digital video stream being continuously produced for publication with a second latency, the second latency being larger than the first latency; and in a publishing step, the central server automatically and continuously providing at least one of said first primary digital video stream, said second primary digital video stream and said first produced digital video stream to at least one of the first participating client and the second participating client and continuously providing said second digital video stream to at least one other participating client.

2. The method of claim 1, further comprising:
said first and second primary digital video streams being provided as a part of a shared digital video communication service, said first participating client and said second participating client both being respective remotely connected participant clients to said shared digital video communication service.

3. The method of claim 2, wherein:
the collecting step comprises collecting said first and/or second primary digital video streams from the shared digital video communication service.

4. The method of claim 2, wherein:
the collecting step comprises collecting at least one primary digital video stream as an external digital video stream collected from an information source being external to said shared digital video communication service, and wherein
the first and/or second digital video stream is produced based on said external digital video stream.

5. The method of claim 1, wherein:
a first and/or the second production step comprises producing the respective produced digital video stream in question based on a set of predetermined and/or dynamically variable parameters regarding visibility of individual ones of said first and/or second primary digital video streams in said produced digital video stream visual and/or audial video content arrangement; used visual or audio effects; and/or modes of output of the produced digital video stream.

6. The method of claim 1, wherein:
the first and/or second production step is performed by a central server, providing said second digital video stream to one or several concurrent consumer clients as a live video stream via an API.

7. The method of claim 1, further comprising:
in an allocating step, allocating a plurality of participating clients across at least two groups of such participating clients, wherein said first and said second primary digital video streams are collected, in said collecting step, from participant clients allocated to a first group of participant clients and a fourth and a fifth primary digital video stream are collected from participant clients allocated to a third group of participant clients;

in said second production step, producing said second digital video stream based on at least one of said first and second primary digital video streams, and further based on at least one of said fourth and fifth primary digital video streams; and in a third production step, producing a third produced digital video stream based on said fourth and fifth primary digital video streams, the third production step comprising time-delaying said fourth and fifth primary digital video streams so that the third produced digital video stream is time-unsynchronized to the first produced digital video stream; and in a publishing step, continuously providing said third produced video digital stream to at least one participant client allocated to said third group.

8. The method of claim 7, wherein:
said first production step comprises time-delaying said first and second primary digital video streams so as to synchronize them to each other, and wherein
said third production step comprises time-delaying said fourth and fifth primary digital video streams so as to time-synchronize them to each other, but using a smaller maximum time-delay than a maximum time-delay used for time-delaying said first and second primary digital video streams in said first production step, resulting in that the first produced digital video stream is not time-synchronized with the third produced digital video stream.

9. The method of claim 7, wherein:
participating clients allocated to each of said groups participate in a video communication service within which the second digital video stream is published; the method further comprising:
associating different ones of said groups to different participator interaction rights in said video communication service, and
associating different ones of said groups to different maximum time-delays used for producing a respective produced video stream published to participant clients allocated to the group in question.

10. The method of claim 9, wherein:
the respective maximum time-delay for each of said groups is determined as a largest latency difference across all primary digital video streams and any produced digital video streams that are continuously published to participating clients in the group in question.

11. A computer software product for providing a shared digital video stream, the computer software product being stored on a non-transitory computer readable storage medium and being arranged to, when executing on a central server that can be accessible in a logically centralized manner, providing a video communication service and/or comprised in a participant client, perform a collecting step, wherein a first primary digital video stream is collected from a first participant client, a second primary digital video stream is collected from a second participant client and a third primary digital video stream is collected from a third participant client;

a first production step, wherein a first produced digital video stream is automatically produced based on said first and second primary digital video streams, the first produced digital video stream being continuously produced for publication with a first latency;

a second production step, wherein the second digital video stream is automatically produced based on said first, second and third primary digital video streams, said second production step comprising automatically detecting events and/or patterns in said primary digital video streams and basing automatic production decisions on said events and/or patterns, the second digital video stream being continuously produced for publication with a second latency, the second latency being larger than the first latency; and a publishing step (136'), wherein at least one of said first primary digital video stream, said second primary digital video stream and said first produced digital video stream is automatically and continuously provided to at least one of the first participating client and the second participating client and said second digital video stream is continuously provided to at least one other participating client.

12. A system for providing a shared digital video stream, the system comprising a central server, the central server being accessible in a logically centralized manner, providing a video communication service and/or being comprised in a participant client and in turn comprising:

a collecting function, wherein a first primary digital video stream is collected from a first participant client, a second primary digital video stream is collected from a second participant client and a third primary digital video stream is collected from a third participant client;

a first production function, wherein a first produced digital video stream is automatically produced based on said first and second primary digital video streams, the first produced digital video stream being continuously produced for publication with a first latency;

a second production function, wherein the second digital video stream is automatically produced based on said first, second and third primary digital video streams, said second production function being arranged to automatically detect events and/or patterns in said primary digital video streams and base automatic production decisions on said events and/or patterns, the second digital video stream being continuously produced for publication with a second latency, the second latency being larger than the first latency; and a publishing function, wherein at least one of said first primary digital video stream, said second primary digital video stream and said first produced digital video stream is automatically and continuously provided to at least one of the first participating client and the second participating client and said second digital video stream is continuously provided to at least one other participating client.

\* \* \* \* \*